(12) United States Patent
Goldeen et al.

(10) Patent No.: US 7,743,116 B2
(45) Date of Patent: Jun. 22, 2010

(54) METHOD AND USER INTERFACE FOR ACCESSING GROUPS OF MEDIA ASSETS

(75) Inventors: Rachel Clare Goldeen, Mountain View, CA (US); Jeffrey Ma, Redwood City, CA (US); Michael Margolis, San Francisco, CA (US); Rainer Brodersen, San Jose, CA (US); Calin Pacurariu, Los Gatos, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 11/754,346

(22) Filed: May 28, 2007

(65) Prior Publication Data

US 2008/0301260 A1 Dec. 4, 2008

(51) Int. Cl.
G06F 15/16 (2006.01)
(52) U.S. Cl. .................. 709/219; 709/217; 709/218
(58) Field of Classification Search ........... 709/217, 709/219, 218; 707/3; 725/86, 58, 113; 715/716
See application file for complete search history.

(56) References Cited

U.S. PATENT DOCUMENTS

| | | | |
|---|---|---|---|
| 6,731,312 B2 | 5/2004 | Robbin | |
| D510,581 S | 10/2005 | Robbin et al. | |
| 7,166,791 B2 | 1/2007 | Robbin et al. | |
| 7,281,220 B1 | 10/2007 | Rashkovskiy | |
| 7,461,059 B2 | 12/2008 | Richardson et al. | |
| 2003/0014753 A1 | 1/2003 | Beach et al. | |
| 2003/0226146 A1 | 12/2003 | Thurston et al. | |
| 2004/0268451 A1 | 12/2004 | Robbin et al. | |
| 2005/0160458 A1 | 7/2005 | Baumgartner | |
| 2007/0083616 A1 | 4/2007 | Madden | |
| 2007/0083911 A1 | 4/2007 | Madden et al. | |
| 2007/0101387 A1* | 5/2007 | Hua et al. | 725/113 |
| 2007/0189737 A1 | 8/2007 | Chaudhri et al. | |
| 2008/0072132 A1 | 3/2008 | Moraveji et al. | |
| 2008/0086456 A1* | 4/2008 | Rasanen et al. | 707/3 |
| 2008/0086750 A1* | 4/2008 | Yasrebi et al. | 725/86 |
| 2008/0140385 A1 | 6/2008 | Mahajan et al. | |

(Continued)

OTHER PUBLICATIONS

Linden et al., "Amazon.com Recommendations, Item-to-Item Collaborative Filtering," IEEE Internet Computing (2003), Web. Jul. 28, 2009.

(Continued)

Primary Examiner—Le Luu

(57) ABSTRACT

Improved systems and methods to navigate, browse, search and/or playback digital media assets (e.g., media items) hosted on a media server are disclosed. One embodiment of the invention pertains to a user interface arrangement, such as a hierarchical menu system, that facilitates navigation, browsing and playing of media items remotely stored on a media server. The user interface arrangement enables user scrolling or browsing with respect to a list or set of information pertaining to media items, where the list or set can be expanded to include information for additional media items that are subsequently acquired. The user interface arrangement can also present and permit navigation of categorized media items. The user interface arrangement can be presented on a display device associated with a client device. In one embodiment, the display device can be a television and the client device can be an electronic apparatus that can couple to the media server via a network.

22 Claims, 28 Drawing Sheets

U.S. PATENT DOCUMENTS

| | | | |
|---|---|---|---|
| 2008/0195947 A1* | 8/2008 | Matsutani | 715/716 |
| 2008/0263600 A1* | 10/2008 | Olague et al. | 725/58 |
| 2008/0276269 A1 | 11/2008 | Miller et al. | |
| 2008/0301167 A1 | 12/2008 | Goldeen et al. | |
| 2008/0301734 A1 | 12/2008 | Goldeen et al. | |
| 2008/0301739 A1 | 12/2008 | Goldeen et al. | |

OTHER PUBLICATIONS

"Save the Internet!", YouTube, Aug. 17, 2006, Jul. 9, 2009, <http://webarchive.org/web/20060820173241/www.youtube.com/watch?v=vhBzPV9FOgA>.

Park et al., "Applying Collaborative Filtering Techniques to Movie Search for Better Ranking." American Assoication for Articial Intelligence (2006) 1-12. Web. Jul. 20, 2009. <http://www.aaai.org>.

Internet Archive of "www.YouTube.com" archived on Aug. 22, 2005.

"Apple TV Coming to Your Living Room" Apple Press Release, Jan. 9, 2007, 1-2 pages.

YouTube Home Page, www.youtube.com, downloaded May 17, 2007. 1-3 pages.

Domingo, "Apple's Front Row", PCMAG.com, Dec. 2, 2005, 1-2 pages.

Spooner, "Media Center PCs Look in the Future", PCMAg.com, Sep. 14, 2005, 1-2 pages.

Office Action for U.S. Appl. No. 11/754,349 mailed Aug. 28, 2009.

Office Action for U.S. Appl. No. 11/754,348 mailed Jul. 31, 2009.

* cited by examiner

METHOD AND USER INTERFACE FOR ACCESSING GROUPS OF MEDIA ASSETS

CROSS-REFERENCE TO OTHER APPLICATIONS

This application references the following patent applications: (i) U.S. patent application Ser. No. 11/754,347, filed May 28, 2007, and entitled "METHOD AND USER INTERFACE FOR ACCESSING MEDIA ASSETS OVER A NETWORK," which is hereby incorporated herein by reference; (ii) U.S. patent application Ser. No. 11/754,349, filed May 28, 2007, and entitled "METHOD AND USER INTERFACE FOR SEARCHING MEDIA ASSETS OVER A NETWORK," which is hereby incorporated herein by reference; and (iii) U.S. patent application Ser. No. 11/754,348, filed May 28, 2007, and entitled "HIERARCHICAL USER INTERFACE FOR ACCESSING RELATED MEDIA ASSETS," which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to user interfaces and, more particularly, graphical user interfaces for access to network-based media assets.

2. Description of the Related Art

Conventionally, graphical user interfaces have been presented on display devices associated with various electronic apparatus. For example, a television utilizes its television screen to present graphical user interfaces that enable a user to configure or program the television. A television can also connect to a set-top box that can also operate to present of a graphical user interface with menus that can be traversed to specify television programs that are to be played as scheduled or on-demand or recorded for subsequent playback. It is common that a remote controller be utilized to interact with the television or set-top box in order to make selections with respect to these graphical user interfaces. Typically, the remote controller utilizes infrared data transmission between the remote controller and the television or set-top box.

With the growth of the Internet, centralized, online hosting of media content has become prevalent. As an example, online media stores are prevalent on the Internet and facilitate review, preview and purchase of media items, such as songs, ring tones or videos. Peer-to-peer sharing of media files is also prevalent on the Internet. Another form of online hosting of media content allows numerous users to publish media content, such as videos, to a media server coupled to the Internet. One example of an online host for media content is YouTube, Inc. operating a media server at the network domain name of "www.youtube.com". Upon submission of a media item to the media server, a submitter can provide information pertaining to the video being submitted. This information can include a title, brief description, category and tag(s). Once submitted and stored to the media server, other users can access the media server via the Internet to browse, search or play the various videos.

SUMMARY OF THE INVENTION

The invention relates to navigating, browsing, searching and/or playback of digital media assets (e.g., media items) hosted on a media server. One embodiment of the invention pertains to a user interface arrangement, such as a hierarchical menu system, that facilitates navigation, browsing and playing of media items remotely stored on a media server. The user interface arrangement enables user scrolling or browsing with respect to a list or set of information pertaining to media items, where the list or set can be expanded to include information for additional media items that are subsequently acquired. The user interface arrangement can also present and permit navigation of categorized media items. The user interface arrangement can be presented on a display device associated with a client device. In one embodiment, the display device can be a television and the client device can be an electronic apparatus that can couple to the media server via a network.

The invention can be implemented in numerous ways, including as a method, system, device, apparatus (including graphical user interface), or computer readable medium. Several embodiments of the invention are discussed below.

As a method for accessing media items from a media server that hosts a plurality of media items, one embodiment of the invention includes at least the acts of: requesting, from the media server, information pertaining to a first set of one or more media items that have at least one common classification; receiving, from the media server, the requested information pertaining to the first set of one or more media items that have the at least one common classification; displaying at least a first portion of the requested information for at least a plurality of the media items in the first set of media items; displaying a user selectable control to initiate a request for information pertaining to a second set of one or more media items that have the at least one common classification, the second set being different from the first set; receiving, from the media server, the requested information pertaining to the second set of one or more media items that have the at least one common classification; and displaying at least a first portion of the requested information for at least a plurality of the media items in the first set of media items or the second set of media items.

As a method for accessing media items from a media server that hosts a plurality of media items, one embodiment of the invention includes at least the acts of: requesting, from the media server, information pertaining to a first set of one or more media items that match a selected category; receiving, from the media server, the requested information pertaining to the first set of one or more media items that match the selected category; displaying at least a first portion of the requested information for at least a plurality of the media items in the first set of media items; displaying a user selectable control to initiate a request for information pertaining to a second set of one or more media items that match the selected category; requesting, from the media server, information pertaining to a second set of media items that match the selected category, the requesting being based on selection of the user selectable control; receiving, from the media server, the requested information pertaining to the second set of media items; and combining the requested information pertaining to the second set of media items with the requested information pertaining to the first set of media items that was previously received.

As a hierarchical menu system for an electronic apparatus coupled to a television, one embodiment of the invention includes at least: a video access category screen that presents a menu of video access categories; and a video review screen that presents a list of video items that pertain to a selected one of the video access categories, the video review screen further presents a user selectable control that enables a user of the electronic apparatus to request additional media items from a video server, wherein the list of video items in the video review screen is expanded to additionally include the additional media items.

As an electronic apparatus for accessing and presenting media information available from a remote media server, one embodiment of the invention includes at least: a display device; a remote controller enabling a user to interact with the electronic apparatus; a memory device for storing data and computer program instructions; and a processor configured to execute computer program instructions stored in the memory device. The computer program instructions include at least: computer program instructions for requesting, from the media server, information pertaining to a first set of one or more media items that match a selected category; computer program instructions for receiving, from the media server, the requested information pertaining to the first set of one or more media items that match the selected category; computer program instructions for displaying at least a first portion of the requested information for at least a plurality of the media items in the first set of media items; computer program instructions for displaying a user selectable control to initiate a request for information pertaining to a second set of one or more media items that match the selected category; computer program instructions for requesting, from the media server, information pertaining to a second set of media items that match the selected category, the requesting (e) being based on selection of the user selectable control; computer program instructions for receiving, from the media server, the requested information pertaining to the second set of media items; and computer program instructions for combining the requested information pertaining to the second set of media items with the requested information pertaining to the first set of media items that was previously received.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF THE INVENTION

The invention relates to navigating, browsing, searching and/or playback of digital media assets (e.g., media items) hosted on a media server. One embodiment of the invention pertains to a user interface arrangement, such as a hierarchical menu system, that facilitates navigation, browsing and playing of media items remotely stored on a media server. The user interface arrangement enables user scrolling or browsing with respect to a list or set of information pertaining to media items, where the list or set can be expanded to include information for additional media items that are subsequently acquired. The user interface arrangement can also present and permit navigation of categorized media items. The user interface arrangement can be presented on a display device associated with a client device. In one embodiment, the display device can be a television and the client device can be an electronic apparatus (e.g., set-top box) that can couple to the media server via a network. A wireless remote controller can be used by a user to interact with the user interface arrangement and/or the search user interface.

"Media item," as used herein, is digital data that pertains to at least one of audio, video, or images. A media item can also be referred to as a digital media asset. The digital data for a media item can be referred to as media data or media content. Some examples of specific forms of media items include, but are not limited to, songs, albums, audiobooks, playlists, movies, music videos, photos, computer games, podcasts, audio and/or video presentations, etc. Video media items include movies, music videos, video presentations, and any other media items having a video characteristic.

Embodiments of the invention are discussed below with reference to FIGS. 1-36. However, those skilled in the art will readily appreciate that the detailed description given herein with respect to these figures is for explanatory purposes as the invention extends beyond these limited embodiments.

Figure 1:
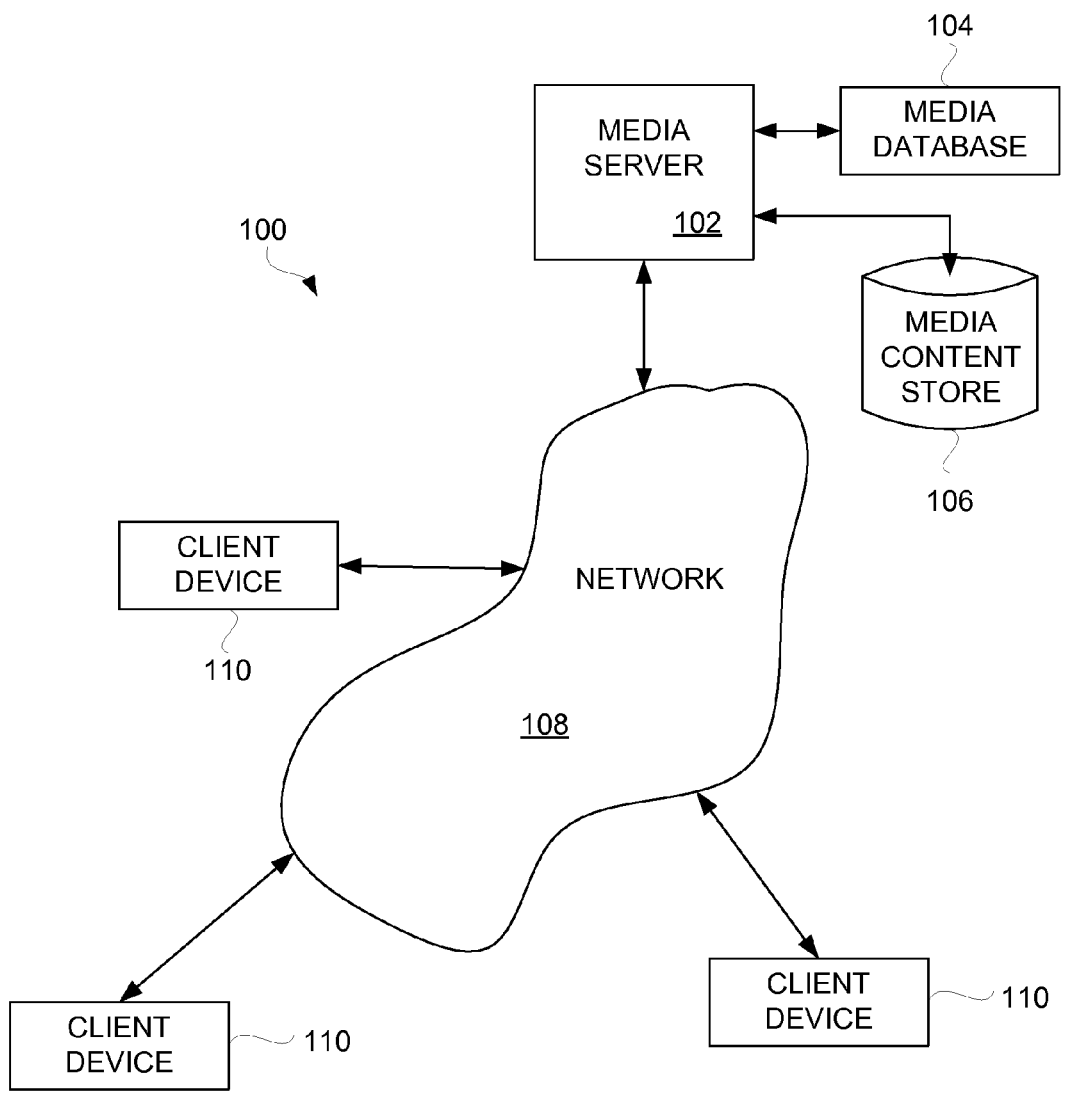
FIG. 1 is a block diagram of a media browse and playback system according to one embodiment of the invention.

FIG. 1 is a block diagram of a media browse and playback system 100 according to one embodiment of the invention. The media browse and playback system 100 includes a media server 102. The media server 102 is a computing device that hosts media items that are available for browsing, reviewing or purchasing by remotely located users. The media server 102 includes or couples to a media database 104 and a media content store 106. The media database 104 stores information pertaining to a plurality of media items that are supported by the media server 102. The media content store 106 stores the media content for the plurality of media items that are supported by the media server 102. The media server 102 couples to a network 108. The network 108 is typically a global public network, but can also be a wide area or local area network. The network 108 can be wired or wireless, or some combination thereof. The media browse and playback system 100 also includes a plurality of client devices 110. The client devices 110 are geographically located in different positions but can access the media server 102 to browse, review or acquire media items hosted by the media server 102 via the network 108. One advantage of the media browse and playback system 100 is that remote digital media assets (e.g., media items) are able to be navigated, browsed and played locally at the client devices 110.

In one embodiment, the client devices 110 are set top boxes that couple to televisions. The televisions output the media items that are provided by the media server 102 to the client device 110 via the network 108. As an example, the client device 110 can include a set top-box. The set-top box interacts with the television to display or otherwise output media items. A user of a client device 110 can interact with the client device 110 in a variety of different ways. For example, in one implementation, a user can utilize a remote control, such as an infrared remote controller, to interact with a graphical user interface presented on a display device (e.g., television) associated with the client device 110. The graphical user interface facilitates the browse and playback media items that are resident on the media server 102. A media item resident at the media server 102 can be streamed to the client device 110 should the user of the client device 110 be interested in reviewing (e.g., playing) the media item. Besides browsing and playing back one or more media items from the media server 102, a user of the client device 110 can also search the media items hosted by the media server 102, log in or log out to the media server 102, rate media items, access related media items, and search media items.

Figure 2:
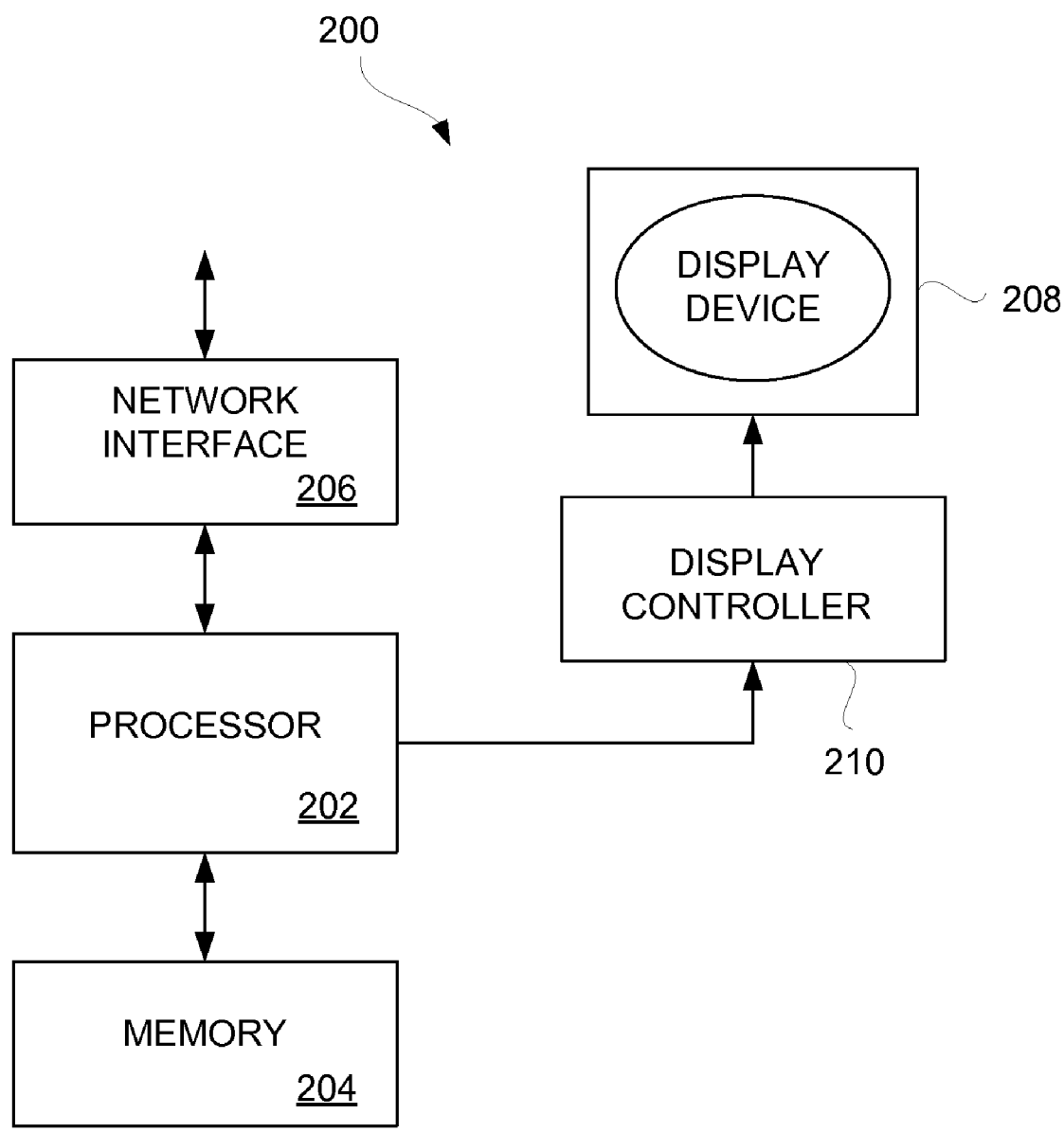
FIG. 2 is a block diagram of a client device according to one embodiment of the invention.

FIG. 2 is a block diagram of a client device 200 according to one embodiment of the invention. The client device 200 is, for example, suitable for use as the client device 110 illustrated in FIG. 1. The client device 200 includes a processor 202 that controls the overall operation of the client device 200. The processor 202 couples to a memory 204. The memory 204 can store program code executable by the processor 202. The memory 204 can also provide temporary or long-term storage for media data. The client device 200 also includes a network interface 206 that enables the client device 200 to communicate over a network such as the network 108 illustrated in FIG. 1. Still further, the client device 200 can include a display device 208 that couples to the processor 202 via a display controller 210. The processor 202 can thus control the text and/or graphical information being presented on the display device 208. Although the client device 200 is illustrated as including the display device 208, it should be recognized that the display device 208, alone or in combination with the device controller 210, can be associated with a separate electronic apparatus that is electrically coupled to the client device 200. In one implementation, the display device 208 and the display controller 210 are provided by a television that is coupled to the client device 200. Still further, the client device 200 can include a wireless receiver (not shown) that is capable of receiving wireless signals from a remote controller.

Figure 3:
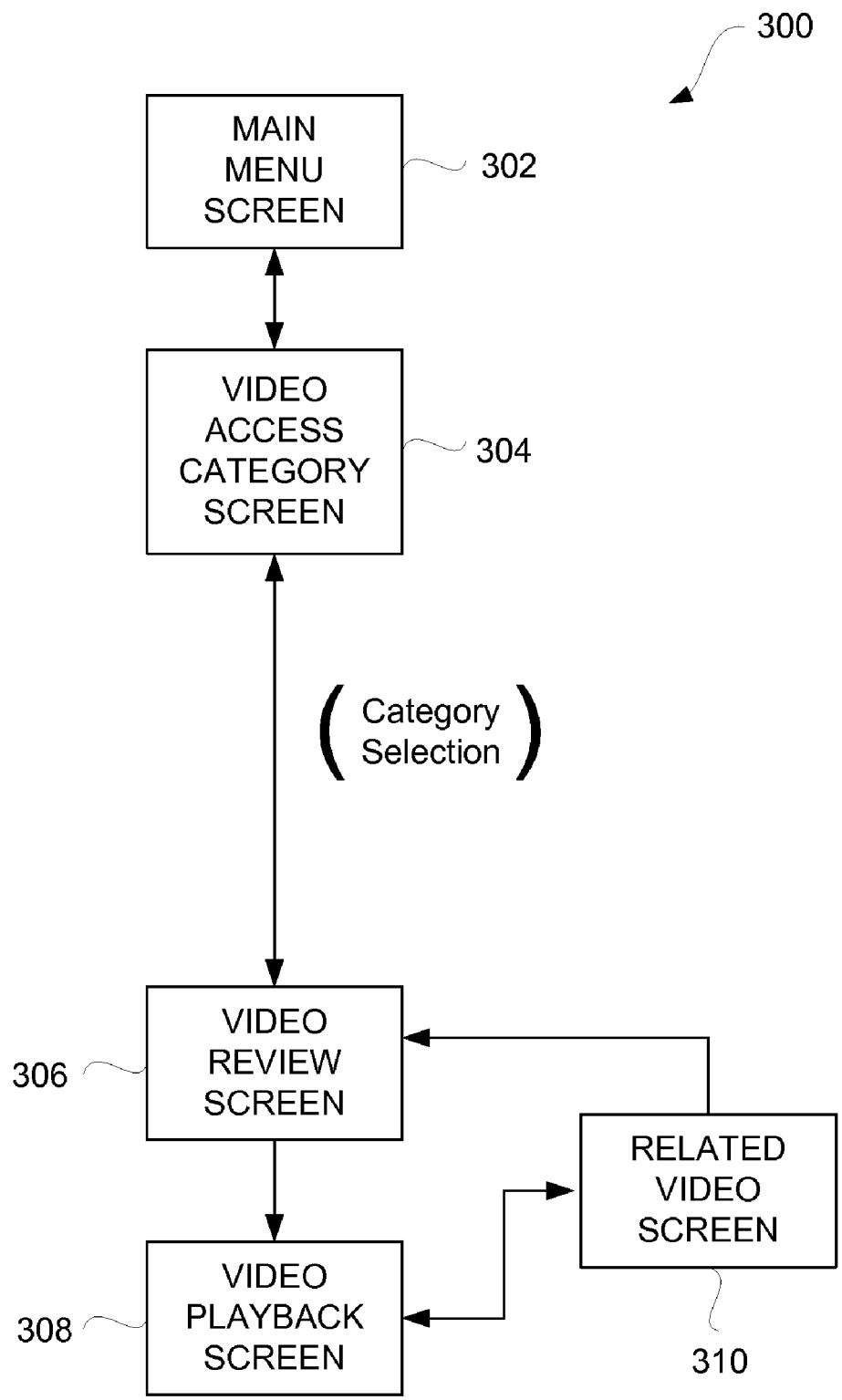
FIG. 3 is a diagram of a screen navigation arrangement according to one embodiment of the invention.

FIG. 3 is a diagram of a screen navigation arrangement 300 according to one embodiment of the invention. The screen navigation arrangement 300 begins with a main menu screen 302. From the main menu screen 302, a video access category screen 304 can be accessed. For example, one selectable item on the main menu provided on the main menu screen 302 can pertain to navigation to obtain access to video items (video assets). Upon selecting the video access item from the main menu, the video access category screen 304 can be displayed. The video access category screen 300 can present a list of categories that pertain to video access. A user can select one of the categories for further navigation. Exemplary categories can include: featured, most viewed, most recent, top rated, favorites, or history. Hence, once a category has been selected from the video access category screen 300, a video review screen 306 can present information on a plurality of video items that are associated with the selected category. From the video review screen 306, a user can review information pertaining to one or more of the video items identified by the video review screen 306. One of these video items can be selected for playback by the user. After a user selects a video item from the video review screen 306 for playback, playback of the selected video can be presented in a video playback screen 308. Once the video playback ends (e.g., exits), a related video screen 310 can be automatically presented. The related video screen 310 can include, at least, one or more video items that are determined to be related to the particular video item that was played back in the video playback screen 308. From the related video screen 310, the user is (among other things) able to select another video item, such as one of the related video items, to be, to be played.

Figure 4:
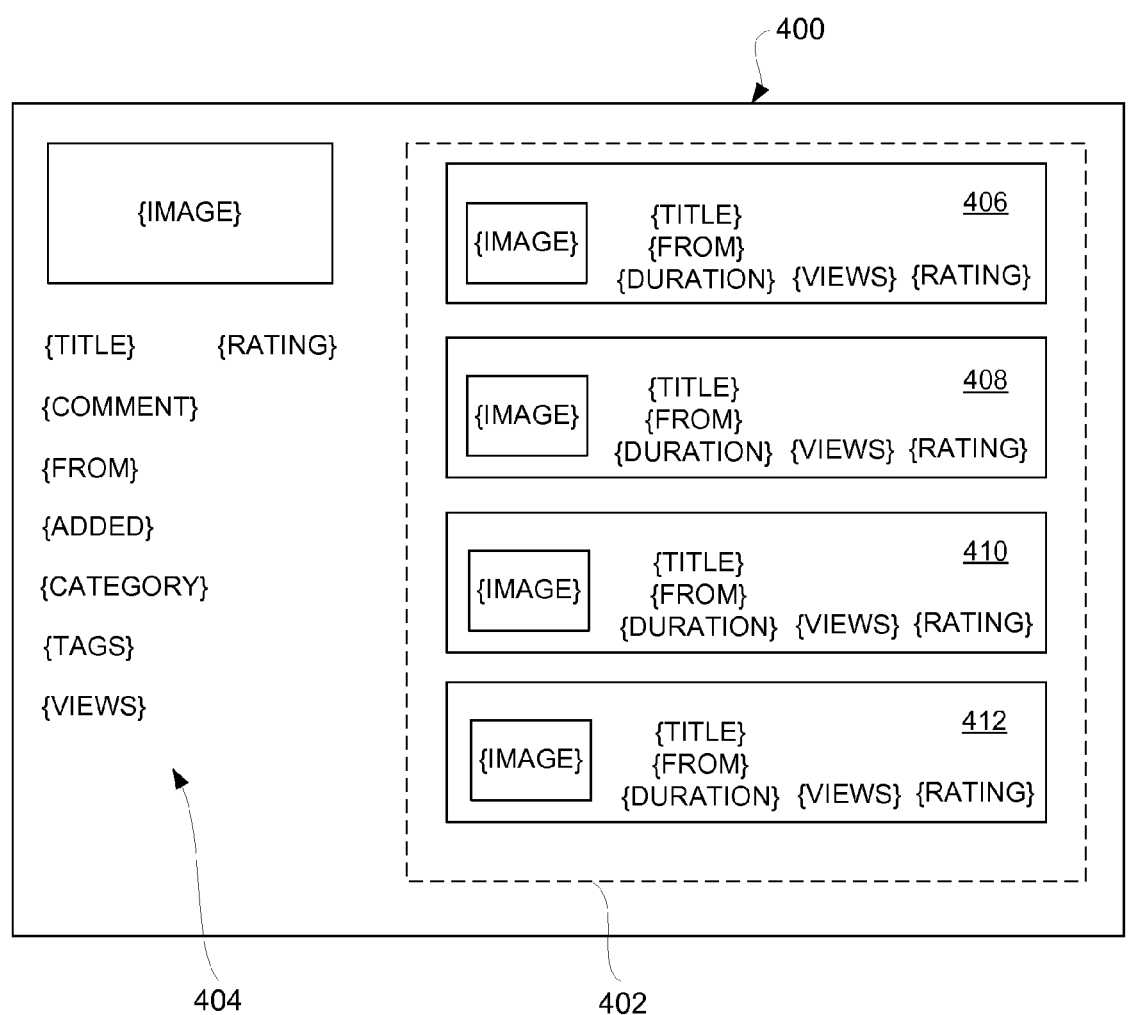
FIG. 4 illustrates a media review screen according to one embodiment of the invention.

FIG. 4 illustrates a media review screen 400 according to one embodiment of the invention. The media review screen 400 is, for example, suitable for use as the video review screen 306 illustrated in FIG. 3.

The video review screen 400 includes a media list area 402 and a media detail area 404. The media list area 402 presents a list of information pertaining to a plurality of media items is provided. In particular, the media list area 402 being displayed includes media information can pertain to media item A 406, media item B 408, media C 410 and media item D 412. In one embodiment, the media items are videos. However, in other embodiments, the media items can be other types of media items or even a mixture of different types of media items.

As illustrated in FIG. 4, in one example, the information being displayed for a particular media item being identified in the media list area 402 can include an image, a title, a submitter, a duration, etc. In addition, the information pertaining to the particular media item can also include an indication of a number of times the media item has been viewed and/or a rating that has been associated with the media item. The media item information being provided for the plurality of media items within the media list area 402 can pertain to the same or different types of media items.

The video detail area 404 can include detailed information pertaining to a selected one of the media items being referenced in the media list area 402. In one example, if the media item A 406 is selected in the media list area 402, the video detailed area 404 displays information pertaining to the media item A 406. In another example, if the media item B 408 is selected in the media list area 402, the video detail area 404 displays information pertaining to the media item B 408. As illustrated in FIG. 4, the detailed information for the selected media item being presented in the media detail area 404 can include one or more of: an image for the media item, a title for the media item, a comment pertaining to the media item, an indication of who submitted the media item (i.e., from), an indication of when the media item was added, a category for the media item, one or more tags for the media item, a number of times the media item has been viewed, and a rating for the media.

The media list area 402 can only display information for a limited number of media items. Hence, in one embodiment, the particular information for the media items being displayed within the media list area 402 can be scrolled so that additional information pertaining to other media items can be viewed within the media list area 402. In one embodiment, a client device may not have all the media information for all of the media items that are to be displayed in the media list area 402. In such case, the media review screen 400 can include a "more" control (e.g., button) that allows the user to request that information pertaining to additional ones of the associated media items be retrieved from a media server. When the additional information for the different media items is obtained, it can be concatenated to the list of information for other of the media items that has already been received at the client device. As a result, the user is able to scroll or otherwise browse through the various media items within the media list area 402 efficiently and rapidly regardless of whether they were originally retrieved or subsequently retrieved from the media server.

Figure 5:
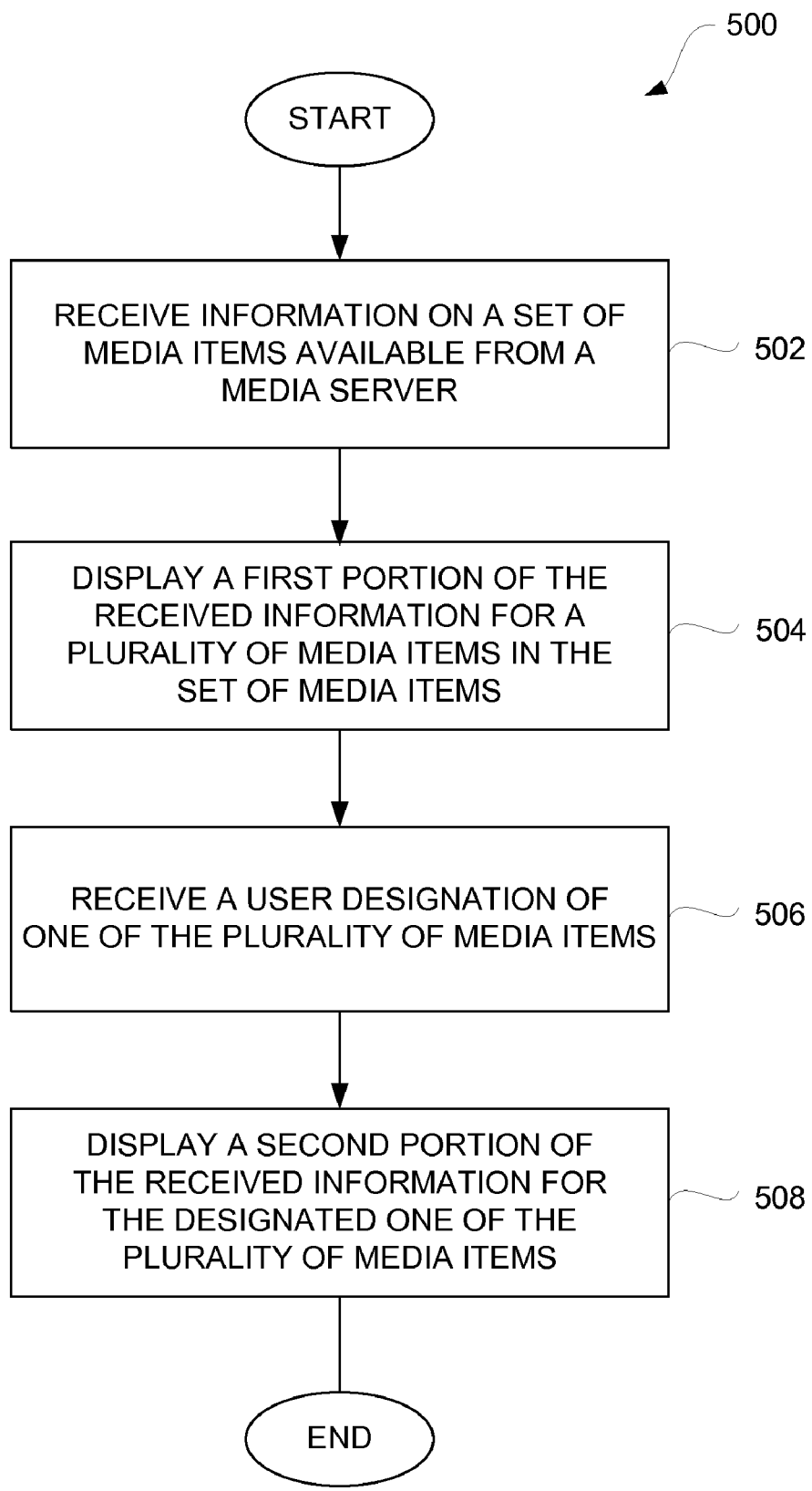
FIG. 5 is a flow diagram of a media review process according to one embodiment of the invention.

FIG. 5 is a flow diagram of a media review process 500 according to one embodiment of the invention. The media review process 500 is, for example, performed by a client device, such as the client device 110 illustrated in FIG. 1 or the client device 200 illustrated in FIG. 2. In one embodiment, the media review process 500 pertains to processing performed by the client device with respect to a video review screen, such as the video review screen 306 illustrated in FIG. 3 or the video review screen 400 illustrated in FIG. 4.

The media review process 500 can receive 502 information on a set of media items available from a media server. A first portion of the received information for a plurality of media items in the set of media items can then be displayed 504. Subsequently, a user designation of one of the plurality of media items can be received 506. For example, a user can interact with the client device to cause one of the plurality of media items to be designated by the user. The designation by the user can, for example, be visually indicated by distinctively displaying the one of the plurality of media items that has been designated. For example, the designated one of the media items can be highlighted in some manner. In one implementation, a user can designate a media item by scrolling to a desired one of the media items in the set of media items. After one of the plurality of media items has been designated by the user, a second portion of the received information for the designated one of the plurality of media items can be displayed 508. In one embodiment, the second portion of the received information at least partially differs from the first portion of the received information. In one implementation, the second portion of received information can overlap with part of the first portion of the received information. In such an implementation, the second portion of received information includes additional information beyond that provided in the first portion of the received information. Following the block 508, the media review process 500 can end. Typically, however, the blocks 506 and 508 can be repeated when the user designation of one of the plurality of media items is changed.

Figure 6A:
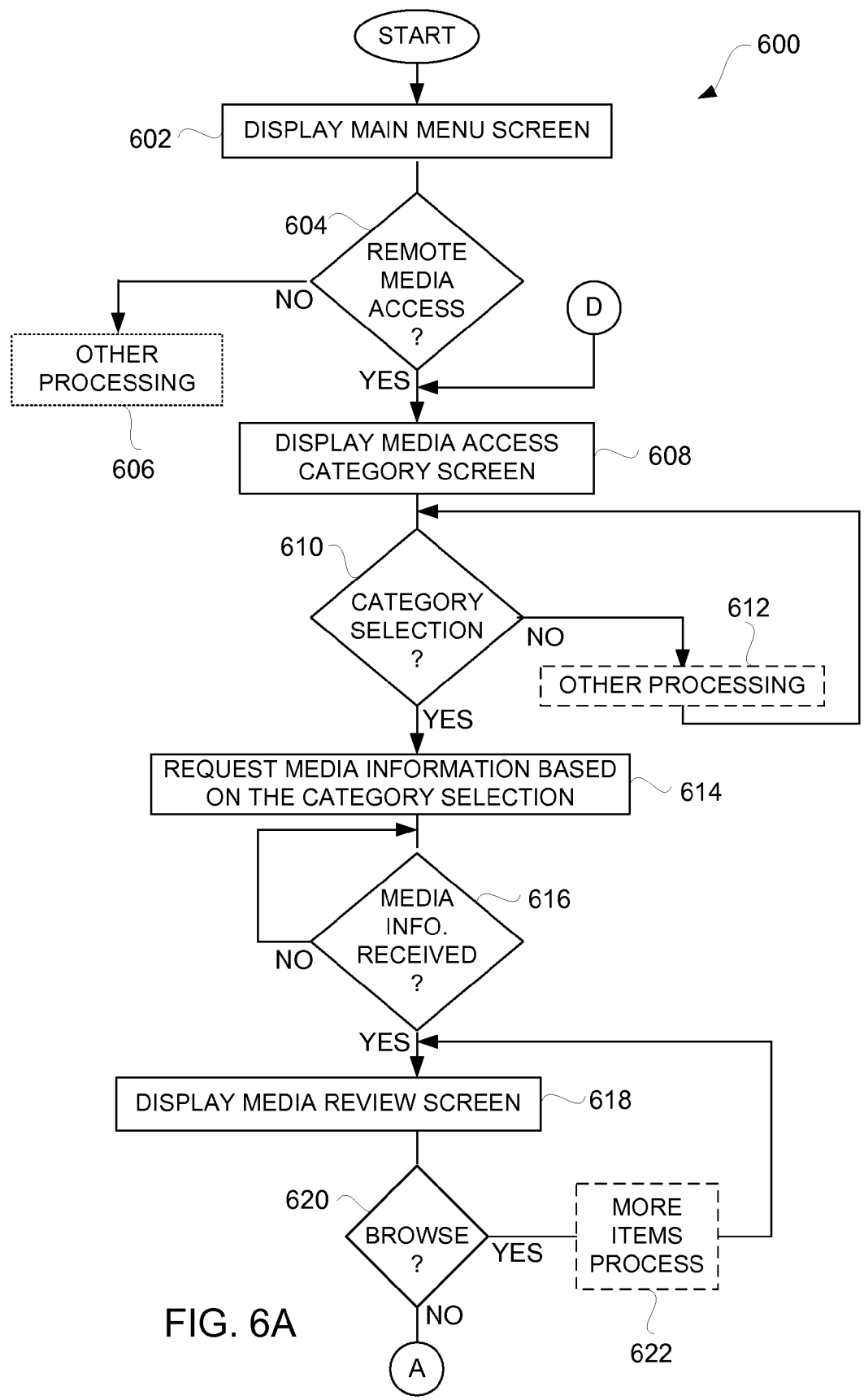
FIGS. 6A-6C are flow diagrams of a media navigation process according to one embodiment of the invention.
Figure 6B:
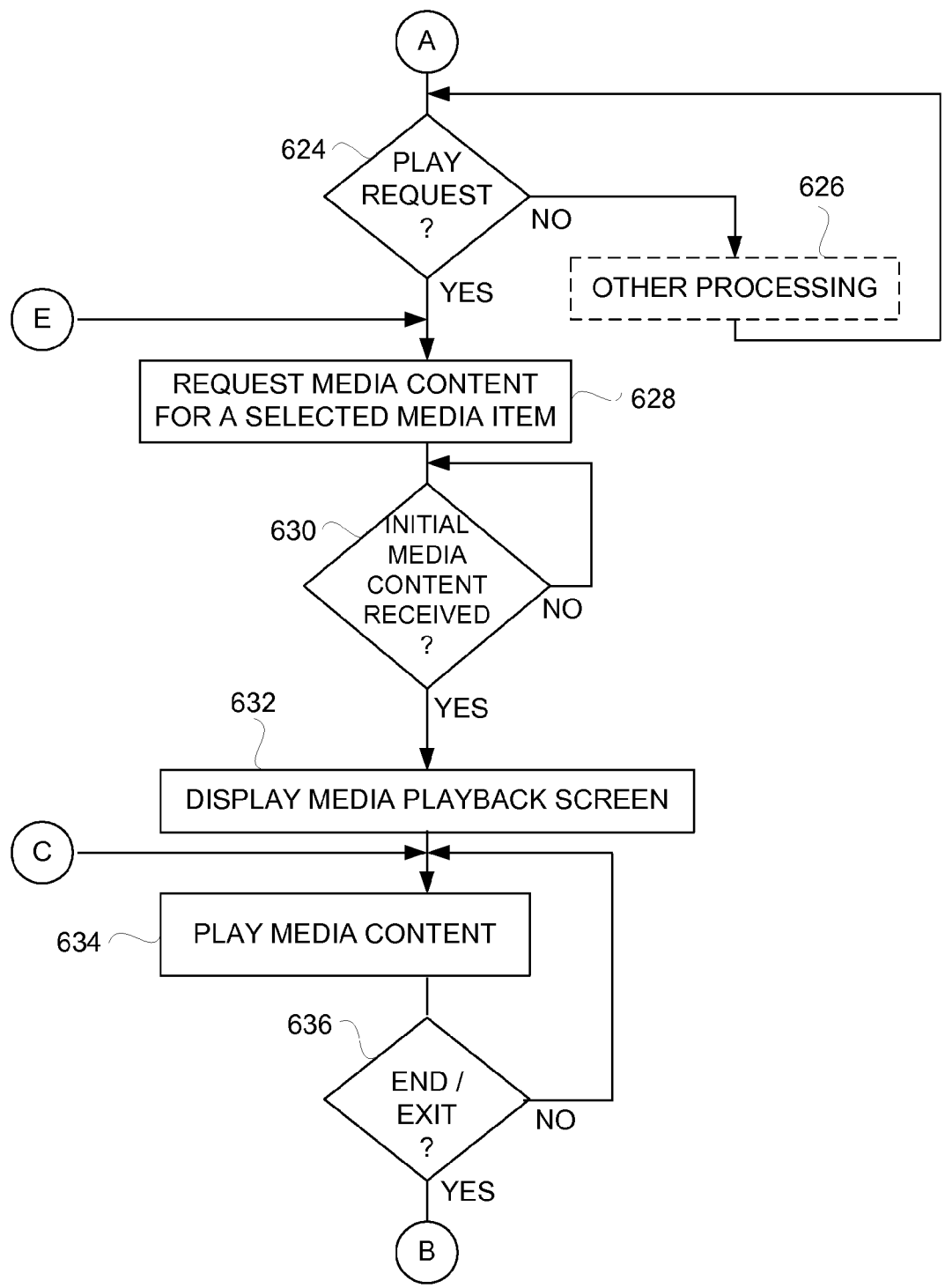
Figure 6C:
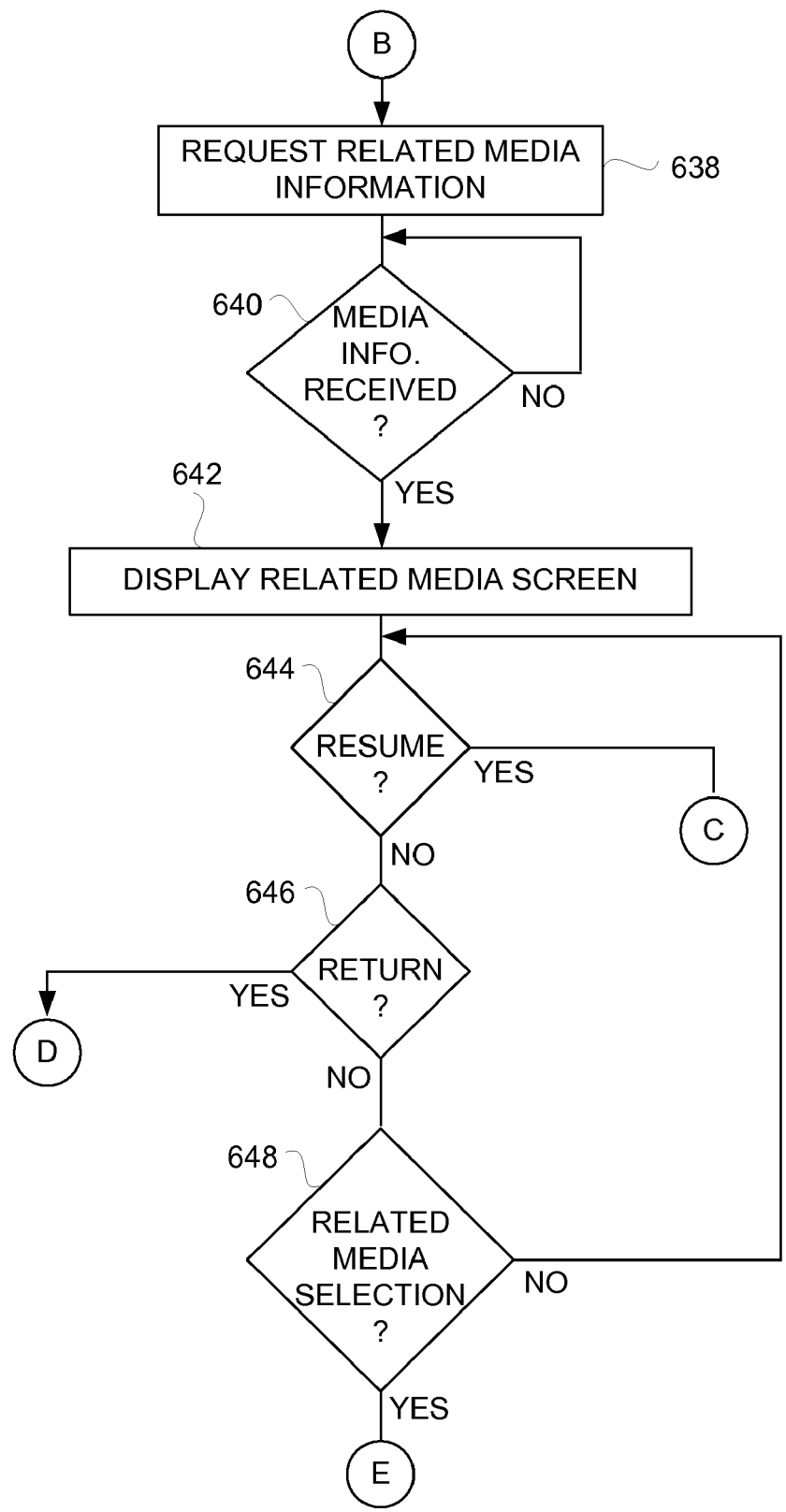

FIGS. 6A-6C are flow diagrams of a media navigation process 600 according to one embodiment of the invention. The media navigation process 600 is, for example, performed by a client device, such as the client device 110 illustrated in FIG. 1 or the client device 200 illustrated in FIG. 2.

The media navigation process 600 can begin with display 602 of a main menu screen. The client device that performs the media navigation process 600 can include a display device. The main menu screen and other screens utilized by the media navigation process 600 can be displayed on the display device. In one implementation, the display device is a television. In another implementation, the display device is a monitor that can receive television programming signals and/or other video signals to be displayed. In still another implementation, the display device is a monitor that can receive control or video signals from a computer.

The main menu screen can offer a user of the client device a plurality of selectable items. One of the selectable items in the main menu screen can pertain to remote media access. When the user selects an item in the main menu screen that does not pertain to remote media access, then other processing 606 can be performed to process the menu selection.

On the other hand, when the user of the client device selects the item in the main menu screen pertaining to remote media access, then a media access category screen can be displayed 608. The media access category screen can present a plurality of selectable categories pertaining to media that is available to be remotely accessed. As examples of categories for media, one embodiment of the invention can include categories such as featured, most viewed, most recent, top rated, favorites, or history.

Next, a decision 610 determines whether a category selection has been made with respect to the media access category screen. When the decision 610 determines that a category selection has not been made, then other processing 612 can optionally be performed. For example, the media access category screen, although primarily providing categories for media, can also include other selectable items that initiate other processing. One example of such other processing 612 is a search process where search criteria would be entered and used to search for media items on a media server.

In any case, when the decision 610 determines that a category selection has been made, media information based on the category selection can be requested 614. Here, the media information being requested 614 is from a media server, such as the media server 102 illustrated in FIG. 1. The media server is typically remote from the client device but accessible over a network (e.g., network 108). Following the request 614 for the media information, a decision 616 determines whether the media information has been received. When the decision 616 determines that the media information has not yet been received, the media navigation process 600 can await its receipt.

Once the decision 616 determines that the media information has been received, a media review screen can be displayed 618. In one embodiment, the media review screen presents at least a portion of the media information that was received. As a result, the user is able to review media information pertaining media items of the selected category via the media review screen.

The media information typically pertains to a plurality of media items that are available from the media server. The media review screen enables the user of the client device to review the media information pertaining to at least a set of the media items. A decision 620 determines whether the user is browsing the media information for the set of media items. When the decision 620 determines that the user is browsing the media information for the media items, the media navigation process 600 returns to repeat the block 618 so that the media review screen can be refreshed. In one embodiment, as media information pertaining to a particular media item is highlighted within the media review screen, the media information for the selected media items can be further presented on the media review screen. For example, the media information being further presented can be additional media information that was not initially displayed. This gives the user the ability to acquire further media information for any of the media items within the set of media items for which the media information is being presented in the media review screen. Optionally, from the media review screen, a more items process 622 can be activated. The more items process 622 is a process that can be performed to acquire media information pertaining another set of media items that are available from the media server. Additional information on the more items process 622 is further discussed below with respect to FIG. 7.

When the decision 620 determines that there is no more browsing, a decision 624 can determine whether a play request has been made. A play request is made with respect to a selected media item. When the decision 624 determines that a play request has not yet been made, then other processing 626 can optionally be performed. The optional other processing 626 can vary depending upon implementation. As one example, the other processing 626 can permit a user to "log in" to the media server or "log out" from the media server. In any case, when the decision 624 determines that a play request has been made, media content for a selected media item is requested 628.

In this regard, a media content request is sent to the host server. A decision 630 determines whether the requested media content has been received. When the decision 630 determines that the requested media content has not been received, then the media navigation process 600 awaits the arrival of the requested media content. In one implementation, before proceeding, the decision 630 only needs to verify receipt of an initial block of the media content for the selected media item (subsequent blocks can be received during playback). While the decision 630 determines that the media content has been received, a media playback screen can be displayed 632. The media playback screen provides a window within which the selected media item can be played. Hence, the media content for the selected media item is played 634.

A decision 636 determines whether end of the playback has been reached or an exit selection has been made with respect to the client device. When the decision 636 determines that an exit selection has not been made, the media navigation process 600 returns to the block 634 so that media content can be continuously played 634. In one implementation, the media content is streamed from the media server to the client device where the media content can be played 634. Once the decision 636 determines that the media content playback has ended or exited before ending, related media information can be requested 638. A decision 640 determines whether the requested media information has been received. When the decision 640 determines that the requested media information has not yet been received, the media management process 600 awaits the receipt of the requested media information.

Alternatively, when the decision 640 determines that the requested media information has been received, a related media screen is displayed 642. The related media screen can present at least a portion of the media information that has been received from the host server. The media information pertains to one or more media items that are related to the selected media item that was previously played at block 634. From the related media screen, in one embodiment, the user of the client device can resume (or replay) playback of the selected media item, return to the higher order menu to re-navigate remote media access, or select a related media item for playback. After the related media screen is displayed 642, a decision 644 determines whether the playback of the selected media item is to resume (or repeat). When the decision 644 determines that the playback of the selected media items should resume, then the media navigation process 300 returns to repeat the block 634 and subsequent blocks so that the play back of the selected media item can continue.

Alternatively, when the decision 644 determines that the playback of the selected media is not to resume, a decision 646 determines whether the media navigation process 600 should return to an earlier media screen. When the decision 646 determines that the media navigation process 600 should return to an earlier media screen, the media navigation process 600 returns to repeat the block 608 so that a media access category screen can be presented and the user can navigate as previously discussed.

Alternatively, when the decision 646 determines that the media navigation process 600 is not to return to an earlier media screen, a decision 648 determines whether a related media selection has been made. When the decision 648 determines that a related media selection has not been made, the media navigation process 600 can return to repeat the decision 644. On the other hand, when the decision 648 determines that a related media selection has been made, the media navigation process 600 returns to repeat the block 628 so that media content for the related media selection can be requested.

Figure 7:
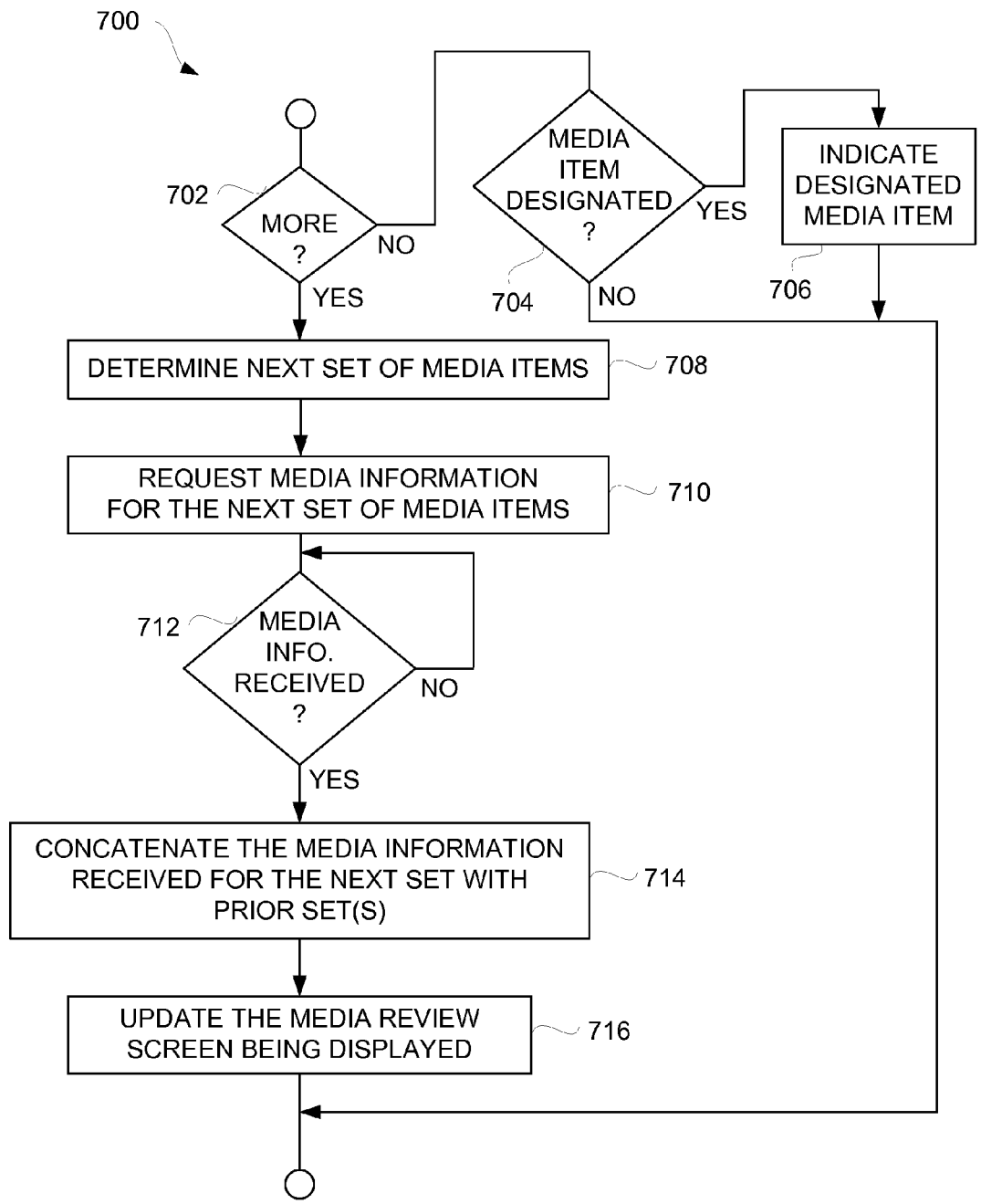
FIG. 7 is a flow diagram of a more items process according to one embodiment of the invention.

FIG. 7 is a flow diagram of a more items process 700 according to one embodiment of the invention. The more items process 700 is, for example, one embodiment suitable for use as the more items process 622 optionally utilized within the media navigation process 600 illustrated in FIG. 6A.

The more items process 700 can begin with a decision 702 that determines whether more items have been requested. As an example, the media review screen being displayed 618 can include a user interface control that is user selectable. For example, the user interface control can be a "button" or "bar" that is displayed on a display device and able to be selected by a user. Upon user selection of the user interface control, the more items process 700 can be activated. In any case, when the decision 702 determines that more items are not being requested, a decision 704 can determine whether a media item has been designated. When the decision 704 determines that a media item has been designated, the designated media item is indicated 706. For example, the designated media item is typically one of the media items associated with the media information being presented by the media review screen. The indication 706 of the designated media item can thus be performed by highlighting the media information associated with the designated media item. Following the block 706, as well as following the decision 704 when a media item is not designated, the more items process 700 bypasses other processing since more items are not currently being requested.

On the other hand, when the decision 702 determines that more items are being requested, then a next set of media items can be determined 708. For example, the next set can include twenty (20) media items. The size of the next set can also be further restricted to the number of available media items from the media server (if known by the client device). Media information for the next set of media items can then be requested 710. A decision 712 determines whether the requested media information has been received. When the decision 712 determines that the requested media information has not yet been received, the more items process 700 awaits the requested media information. Once the decision 712 determines that the requested media information has been received, the media information received for the next set of media items can be concatenated 714 with media information from any prior sets of media items. The media review screen being displayed can then be updated 716. Once updated 716, the media review screen can support the user browsing/scrolling not only the media information for the next set of media items but also for the media information for any other previously acquired sets of media items (since the media information for the various sets have been concatenated 714). For example, the media information for the one or more sets of media items can be combined into a list that is at least partially displayed within the media review screen, but thereafter permitted to be scrolled to other regions of the list. Following the block 716, the more items process 700 can end.

Figure 8A:
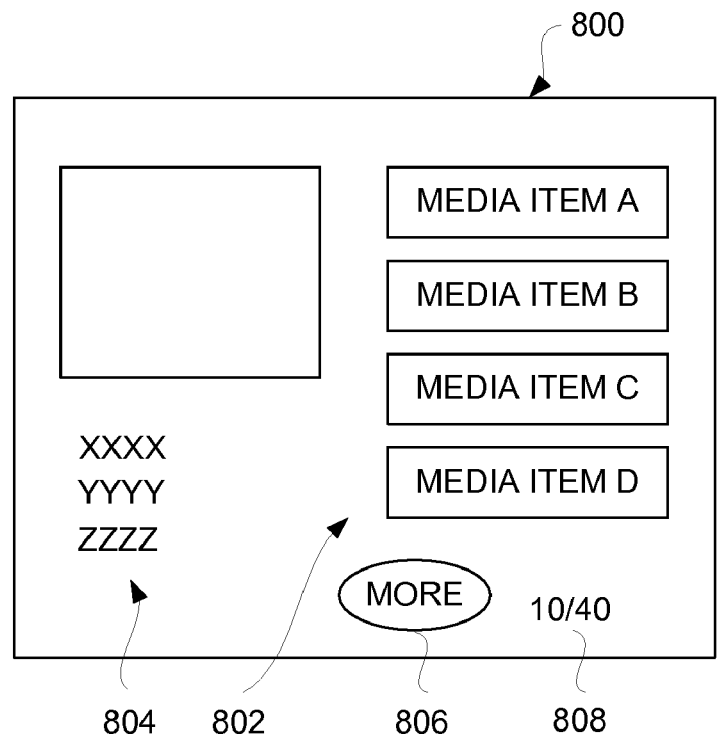
FIG. 8A illustrates a media review screen according to one embodiment of the invention.

FIG. 8A illustrates a media review screen 800 according to one embodiment of the invention. The media review screen 800 has a format similar to the media review screen 400 illustrated in FIG. 4. Namely, the media review screen 800 includes a media list area 802 that displays media information pertaining to a plurality of media items (i.e., media items A, B, C and D). In addition, the media review screen 800 includes a media detail area 804 that presents an image as well as additional information pertaining to a selected one of the media items from the media list area 802. The media review screen 800 can also support a user in requesting more items. The media review screen 800 includes a user interface control 806 (e.g., "more" button) that can be selected by a user. When the user interface control 806 is selected, in one embodiment, the more items process 700 can be activated to acquire information on more media items from a media server.

In addition, as shown in FIG. 8A, an item availability indicator 808 can be displayed within the media review screen 800. The item availability indicator 808 can indicate the number of media items currently supported by the media review screen 800 with respect to a total number of available media items from the media server that match a category or search criteria. As shown in FIG. 8A, the item availability indicator 808 can indicates that ten (10) out of a total of forty (40) media items have been acquired by the client device and are available to be browsed within the media list area 402. For example, although information for four distinct media items (e.g., media item A, B, C and D) are displayed in the media list area 802 as illustrated in FIG. 8A, since the client device currently has the media information for ten (10) distinct media items, the user can interact with the media list area 802 to scroll or browse and thereby select any of the ten (10) media items. By selection of the user interface control 806, more media information pertaining to additional ones of the media items can be obtained.

Figure 8B:
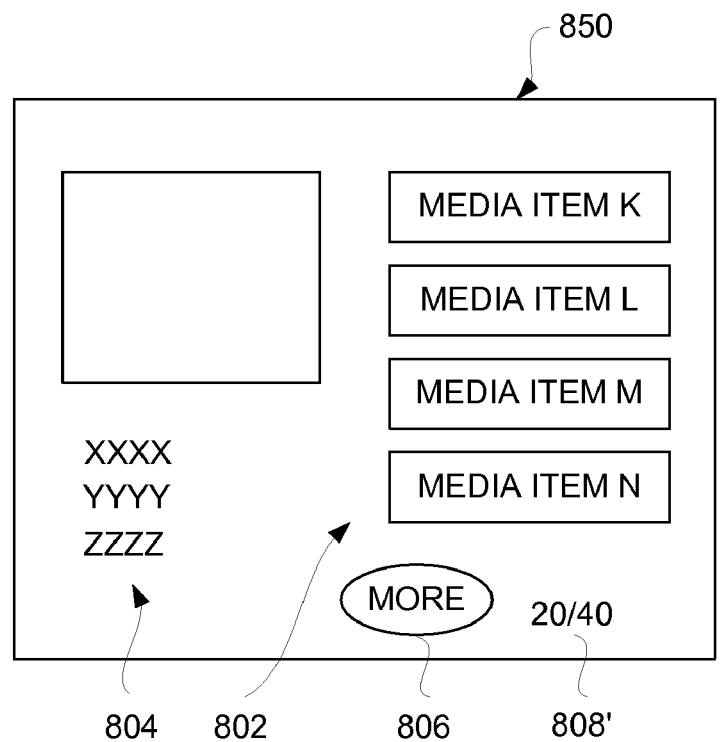
FIG. 8B illustrates a media review screen according to one embodiment of the invention after more items have been acquired by a client device.

FIG. 8B illustrates a media review screen 850 according to one embodiment of the invention after more items have been acquired by a client device. The media review screen 850 is generally similar to the media review screen 800. However, the media review screen 850 represents the media review screen 800 illustrated in FIG. 8A after the user interface control 806 (e.g., "more" button) has been selected one or more times such that more media items have been acquired by a client device. Hence, the media review screen 850 displays an updated item availability indicator 808' that indicates that now twenty (20) media items out of a total of forty (40) available media items have been received at the client device and are available to be scrolled or browsed within the media list area 802.

Figure 9:
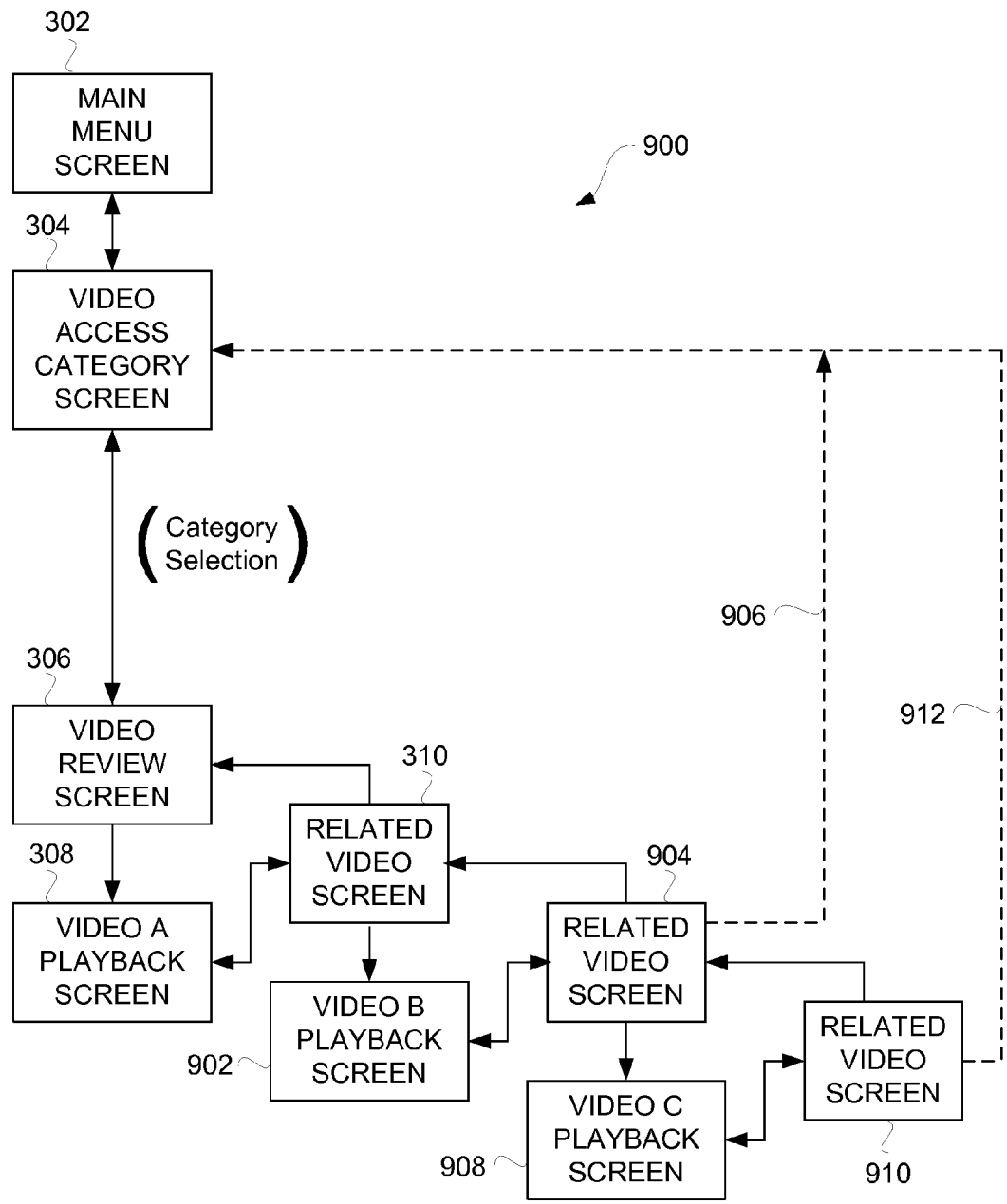
FIG. 9 is a diagram of a screen navigation arrangement according to one embodiment of the invention.

FIG. 9 is a diagram of a screen navigation arrangement 900 according to one embodiment of the invention. The screen navigation arrangement 900 includes screens 302-310 that provide a hierarchy of user interface screens that can be presented on a display device of a client device as previously discussed with respect to FIG. 3. In addition, the screen navigation arrangement 900 can further include a series of additional screens that can be provided in the hierarchy of user interface screens to further support related video items. For example, when the related video screen 310 is being presented on the display device, the screen navigation arrangement 900 allows transition back to the video review screen 306, allows transition back to the video A playback screen 308 so that the playback of the video A can resume or be replayed, and allows transition to a video B playback screen 902. At the video B playback screen 902, the video B can be played back. Here, the video B represents a related video item (e.g., related to video A) that was identified by the related video screen 310 and selected by the user for playback. When the playback of video B ends (or is exited before ending), a related video screen 904 can be presented on the display device. From the related video screen 904, the playback of the video B can be replayed (or resumed). Furthermore, the user can interact with the related video screen 904 to transition back to the related video screen 310 or to transition back via optional path 906 to the video access category screen 304 (or to another screen, e.g., screen 302 or 306). Still further, from the related video screen 904, a user can select a related video to be played. When the user selects a related video item (referred to as video C) to be played from the related video screen 904, the screen navigation arrangement 900 transitions to a video C playback screen 908. At the video C playback screen 908, the video C is played. When the playback of the video C has ended (or exited before ending), a related video screen 910 can be presented on the display device. The related video screen 910 can present one or more related video items that relate to the video C. From the related video screen 910, the user of the client device can replay (or resume) the playback of the video C by transitioning back to the video C playback screen 908. Alternatively, the user of the client device can transition from the related video screen 910 back to the related video screen 904. Since the related video items in the related video screen 904 and the related video screen 910 typically differ since they depend on different video items, the related video screens 904 and 910 are typically different with respect to the related video items being presented. Still further, from the related video screen 910, the user can transition via optional path 912 back to the video access category screen 304 (or to another screen, e.g., screen 302 or 306).

In FIG. 9 there is a nested set of three related video screens. Each related video screen can be considered another level (e.g., levels A, B, C, etc.) in a hierarchical user interface. A user can transition backwards from the related video screen 910, to the related video screen 904, and then to the related video screen 310. Backwards short-cut transition are also available from one or more of the related video screens (e.g., paths 908 and 912). More generally, the nested set of related video screens can include two or more different related video screens. However, for memory conservation reasons, if the user has transitioned downward in the nested set of related video screens by more than a predetermined number (e.g., 5) levels (e.g., nesting limit of five levels), then for subsequent downward transitions, the highest level remaining in the set is removed and the then lowest level is added to the set. If one or more higher levels have been removed, backwards transitions can jump to the video access category screen 304 (or other higher level screen) when the backward transitions reach the top level of the set. For example, if levels A, B, C, D and E are all in use as a nested set of related video screens and the nesting limit is five levels, then on navigation to a subsequent level F the highest level stored A is removed so that the stored levels within the nested set are B, C, D, E and F.

Figure 10:
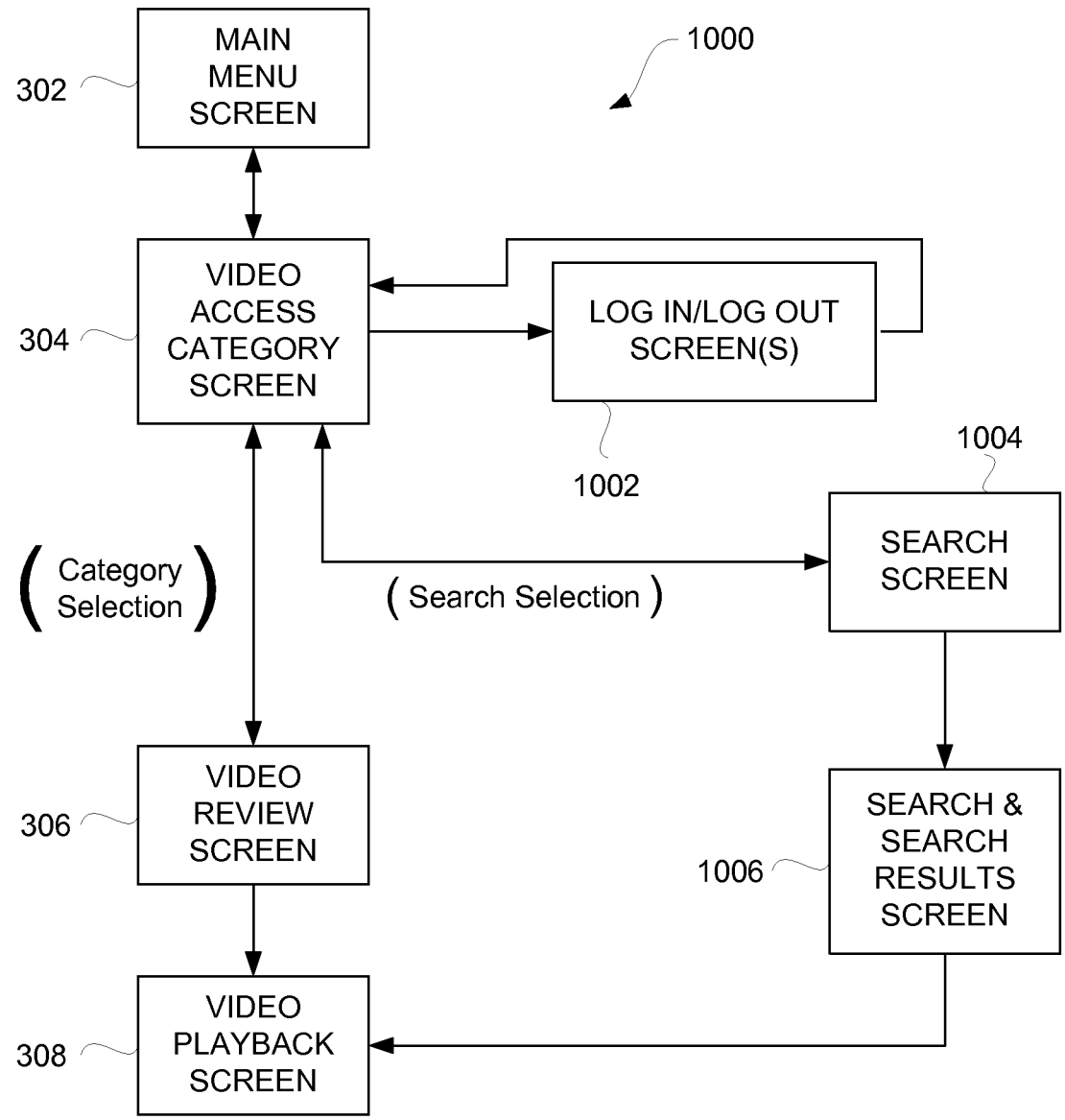
FIG. 10 is a diagram of a screen navigation arrangement according to another embodiment of the invention.

FIG. 10 is a diagram of a screen navigation arrangement 1000 according to another embodiment of the invention. The screen navigation arrangement 1000 includes screens 302-308 that provide a hierarchy of user interface screens that can be presented on a display device of a client device as previously discussed with respect to FIG. 3. In addition, the screen navigation arrangement 1000 can further include a series of additional screens that can be provided in the hierarchy of user interface screens to support (i) log-in/log-out to a media server and (ii) searching for video items. However, to avoid obscuring other features, the one or more related video screens such as illustrated in FIGS. 3 and 9 are not reproduced or required to be utilized with respect to the screen navigation arrangement 1000. It should be understood that the screen navigation arrangement 1000 could further support such related video screens in a similar manner. The screen navigation arrangement 1000 includes the video access category screen 304. In one embodiment, the video access category screen 304 not only supports the various different categories for video items as discussed above, but also other user selectable items, such as log-in/log-out or search. With respect to a log-in/log-out item from the video access category screen 304, a user selection can cause transition to a log-in/log-out screen. For example, if the user has already logged into the media server, a log-out screen 1002 can be presented, whereas if the user is not logged in, then a log-in screen 1002 can be presented. The user can interact with the log-in/log-out screen(s) 1002 to either log-in or out with respect to the media server. In the case of log-in, the one or more log-in screens 1002 can support the user in entering a user name and/or password.

In addition, the video access category screen 304 can support a search item. The search item within the video access category screen 304 can be user selectable. When the search item is selected, a search with respect to media items remotely stored on the media server can be initiated. More particularly, when the search item from the video access category screen 304 is selected, a search screen 1004 can be presented.

The search screen 1004 allows the user to enter one or more characters to be utilized as a search string. The search string is sent to the media server for processing and resulting media items that match the search string can be identified and information thereon can be returned to the client device. In this regard, according to one embodiment, after a user has entered a character to be utilized as the search string (or part of the search string), a search & search result screen 1006 can be presented. The search results returned by the media server can be presented in the search & search results screen 1006. For example, the search & search results screen 1006 can present information describing the video items that match the search string.

In addition, and concurrently, a search dialogue for subsequent entry of additional search characters to be utilized as part of the search string can also be provided. Hence, from the search & search results screen 1006, a user can enter one or more subsequent characters to be utilized as part of the search string which can cause the processing of the search string at the media server such that updated search results can be returned and displayed within the search and search result screen 1006. The search results can cause display of information on one or more video items at the media server that match the search string. From the search results being displayed in the search & search results screen 1006, the user can select one of the video items for playback. Once a video item is selected for playback, the screen navigation arrangement 1000 can transition to the video playback screen 308 where the selected video can be played within a playback window of the video playback screen 308.

Figure 11:
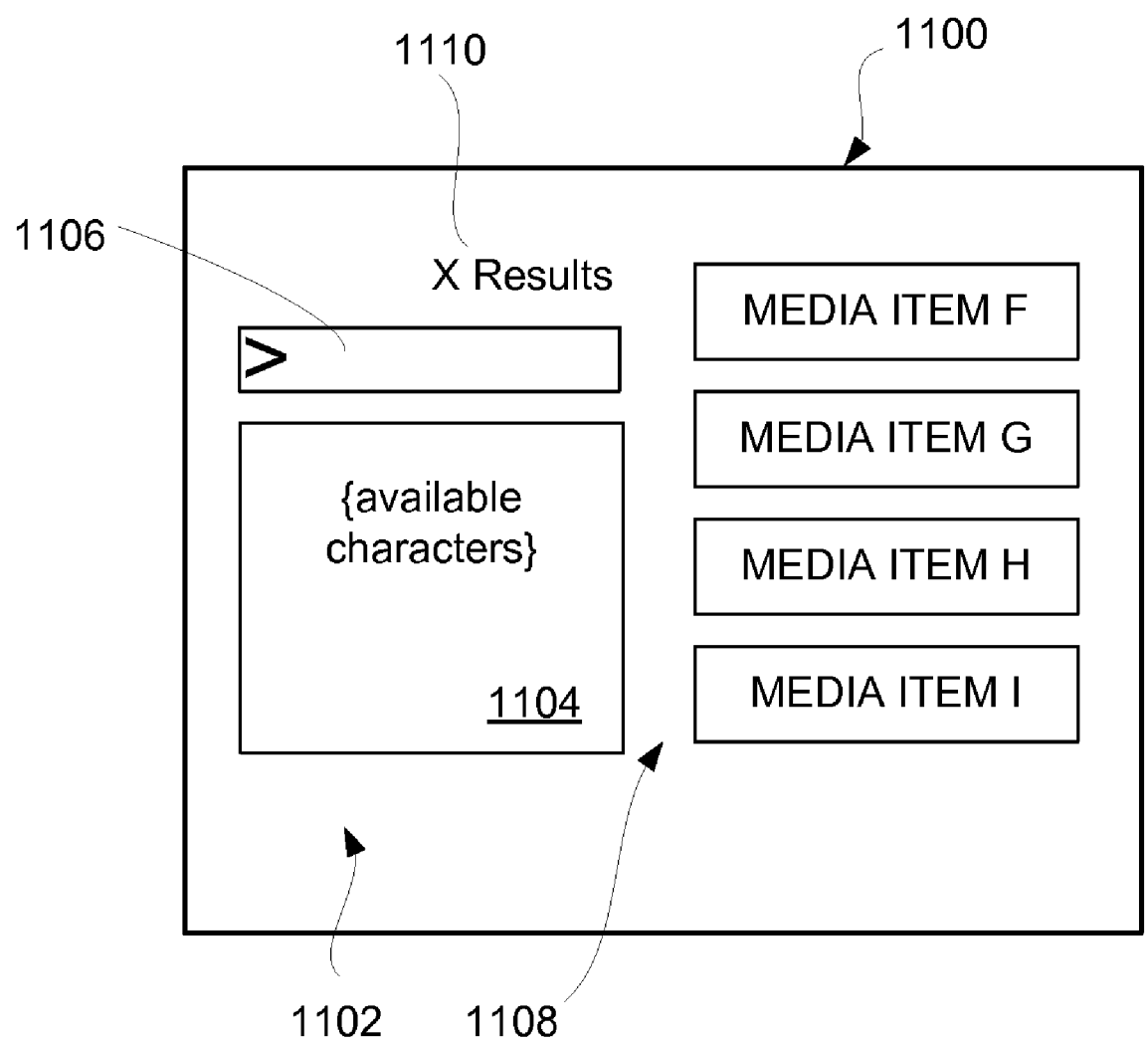
FIG. 11 illustrates a search & search results screen according to one embodiment of the invention.

FIG. 11 illustrates a search & search results screen 1100 according to one embodiment of the invention. The search & search results screen 1100 includes a character selection region 1102 that presents characters 1104 that are available for selection as search characters. The search & search results screen 1100 also include a search entry region 1106 that displays one or more search characters that have been selected from the character selection region 1102. As a search character is selected from the available characters 1104, the selected character is illustrated in the search entry region 1106 and a search process is carried out with respect to a search string that includes at least the selected character. The search process is carried out by a media server and resulting search results can be presented in a search results region 1108. The search result can identify one or more media items available from a media server that match the one or more selected characters (e.g., search string). As illustrated in FIG. 11, the search process can return information pertaining to a plurality of media items (i.e., media items F, G, H and I) that are determined by the media server to match the search string. The search results region 1108 can present information associated with the media items that are determined to match the search string. In one embodiment, the search results region 1108 is presented in a manner similar to that of the media list area 402 illustrated in FIG. 4 which presents a list of information pertaining to a plurality of media items. In particular, the search results region 1108 can display media information pertaining to media item F, media item G, media item H and media item I. In one embodiment, the media items are videos. However, in other embodiments, the media items can be other types of media items or even a mixture of different types of media items. If there are more media items that match the search string than can be presented in the search results region 1108, then the other of the media items that match the search string can be presented by scrolling through the media items. The search & search results screen 1100 can also include a number of results 1110 that can be presented to inform the user of the number of media items that have been determined to match the search string.

From the search & search results screen 1100, a user can designate (e.g., highlight) the media information pertaining to one of the media items. Once designated, the search & search results screen 1100 can present a media detail area similar to the video detail area 404 illustrated in FIG. 4. The media detail area can include detailed information pertaining to a selected one of the media items being designed in the search results region 1108. The search results region can also be referred to as a media list area. In one example, if the media item G is designated in the search results region 1108, the media detail area displays information pertaining to the media item G. As an example, the detailed information for the designated media item being presented in the media detail area can include one or more of: an image for the media item, a title for the media item, a comment pertaining to the media item, an indication of who submitted the media item (i.e., from), an indication of when the media item was added, a category for the media item, one or more tags for the media item, a number of times the media item has been viewed, and a rating for the media. Additionally, the search & search results screen 1100 can be presented at a client device, and one of the media items in the search results region 1108 can be selected for playback at the client device.

Figure 12A:
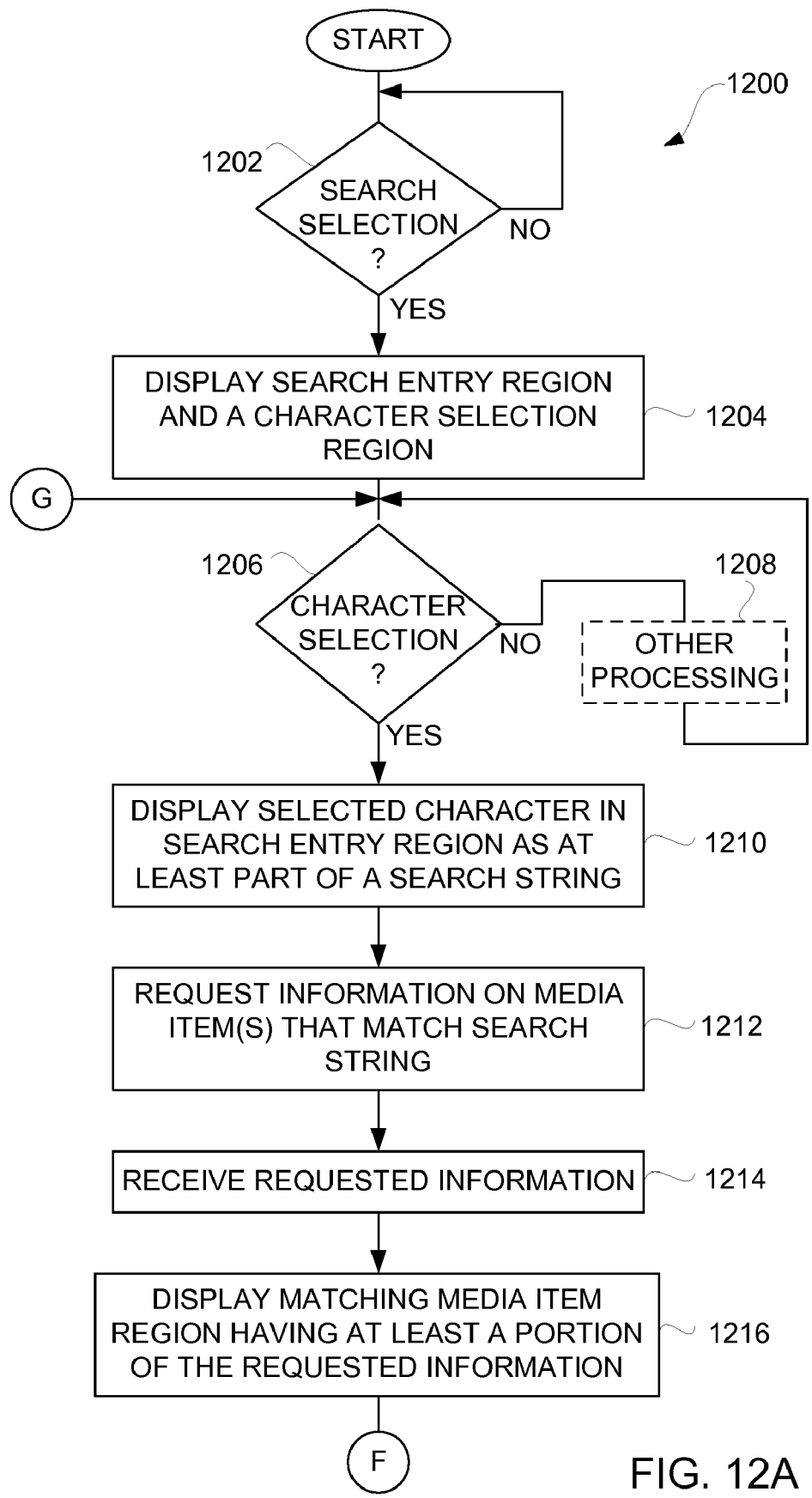
FIGS. 12A and 12B are flow diagrams of a search process according to one embodiment of the invention.
Figure 12B:
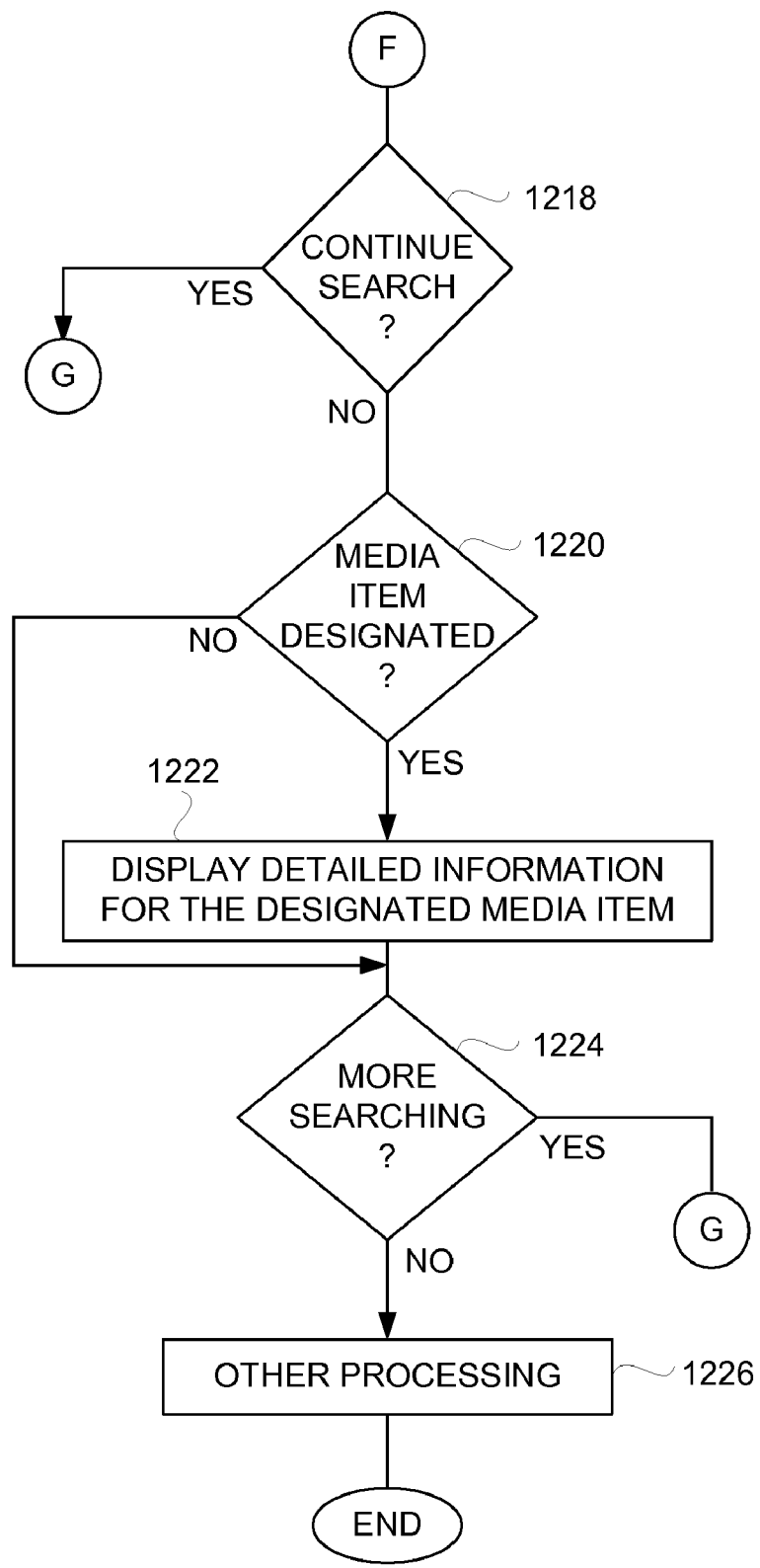

FIGS. 12A and 12B are flow diagrams of a search process 1200 according to one embodiment of the invention. The search process 1200 is, for example, performed by a client device, such as the client device 110 illustrated in FIG. 1 or the client device 200 illustrated in FIG. 2. The search process 1200 can also be performed (in whole or in part) in association with other processing 612 illustrated in FIG. 6A.

The search process 1200 can begin with a decision 1202 that determines whether a search selection has been made.

For example, the search selection can be made with respect to a video access category screen presented on a display screen, such as the video access category screen 304 illustrated in FIG. 10. When the decision 1202 determines that a search selection has not been made, the search process 1200 awaits such a selection.

Once the decision 1202 determines that a search selection has been made, the search process 1200 can continue. In other words, the search process 1200 can be deemed invoked when a search selection has been made. When the search process 1200 continues, a search entry region and a character selection region are displayed 1204. In one implementation, these regions can respectively correspond to the search entry region 1106 and the character selection region 1102 illustrated in FIG. 11. A decision 1206 then determines whether a character selection has been made. For example, the character selection can be made with respect to available characters presented on a display screen, such as the available characters 1104 of the search & search results screen 1100 illustrated in FIG. 11. When the decision 1206 determines that a character selection has not been made, then other processing 1208 can be performed. The other processing can vary with implementation. One example of other processing is returning to another display screen in the hierarchy of screens, such as the video access category screen.

On the other hand, when the decision 1206 determines that a character selection has been made, the selected character can be displayed 1210 in a search entry region as at least part of a search string. Next, information (media information) concerning the one or more media items that match the search string is requested 1212. In one implementation, information concerning the one or more media items is requested from a media server. The requested information is subsequently received 1214. A matching media item region can display 1216 at least a portion of the requested information. The requested information pertains to information concerning one or more media items, and at least a portion of the requested information for the one or more media items can be displayed 1216 in the matching media item region. As an example, the matching media item region can pertain to the search results region 1108 illustrated in FIG. 11.

After the matching media items region is displayed 1216, the user of the client device can, for example, review the search results and decide to continue to search, review detailed information on a media item within the search results, or transition to another display screen in the hierarchy of display screens (e.g., browse, playback, etc.).

In one embodiment, following the block 1216, the search process 1200 can continue with a decision 1218 that determines whether to continue with searching. When searching is to continue, the search process 1200 can return to repeat the decision 1206 and subsequent blocks. Alternatively, when the decision 1218 determines that searching is not to continue, a decision 1220 can determines whether a media item (e.g., one of the matching media items) has been designated. When the decision 1220 determines that the media item has been designated, detailed information for the designated media items can be displayed 1222. Alternatively, when the decision 1220 determines that a media item has not been designated, the block 1222 is bypassed. Following block 1222, or its being bypassed, a decision 1224 determines whether more searching is desired. When more searching is desired, the search process 1200 can return to repeat the decision 1206 and subsequent blocks. Alternatively, when the decision 1224 determines that more searching is not desired, then other processing 1226 can be performed. Following the block 1226, the search process 1200 can end.

Figure 13:
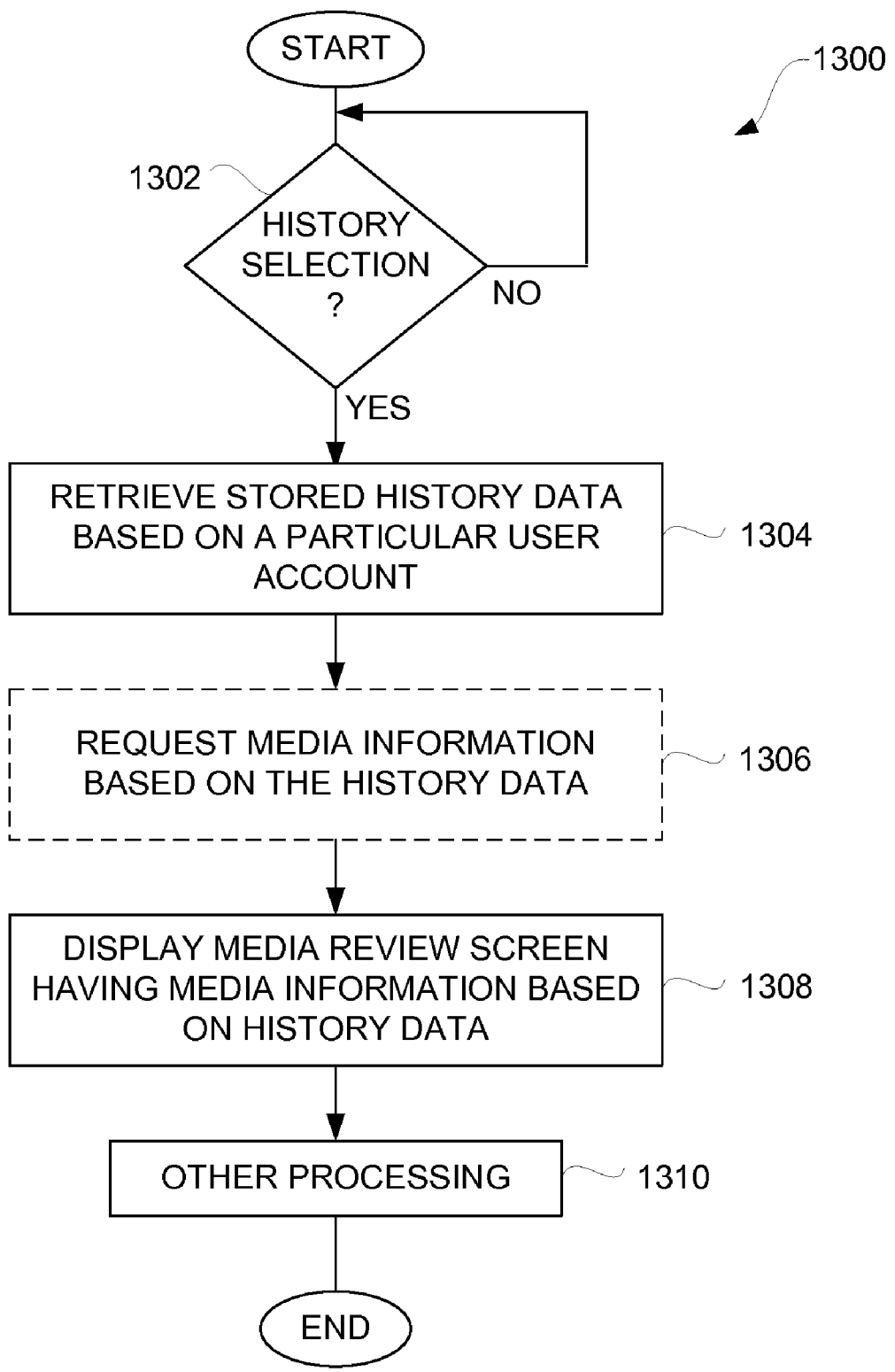
FIG. 13 is a flow diagram of a history process according to one embodiment of the invention.

FIG. 13 is a flow diagram of a history process 1300 according to one embodiment of the invention. The history process 1300 is, for example, performed by a client device, such as the client device 110 illustrated in FIG. 1 or the client device 200 illustrated in FIG. 2. The history process 1300 can also be performed (in whole or in part) in association with other processing 612 illustrated in FIG. 6A.

The history process 1200 can begin with a decision 1302 that determines whether a history selection has been made. For example, the history selection can be made with respect to a video access category screen presented on a display screen, such as the video access category screen 304 illustrated in FIGS. 3 and 10. When the decision 1302 determines that a history selection has not been made, the history process 1300 awaits such a selection.

Once the decision 1302 determines that a history selection has been made, the history process 1300 can continue. In other words, the history process 1300 can be deemed invoked when a history selection has been made. When the history process 1300 continues, stored history data associated with a particular user can be retrieved 1304. I The stored history data can be locally or remotely stored. In one implementation, history data is stored on a per account basis. Hence, the history process 1300 can, in one embodiment, operate to require that the particular user be logged-in (e.g., with respect to the media server) before the stored history data can be retrieved 1304. The stored history data being retrieved 1304 may or more not include adequate media information for display of the media information. Hence, optionally, media information based on the history data can be requested 1306 from the media server. Next, a media review screen having media information based on the history data can be displayed 1308. Thereafter, other processing 1310 can be performed. Examples of other processing include (i) browsing or scrolling the display of media information for the media items, (ii) review detailed information on a media item, or (iii) transition to another display screen in the hierarchy of display screens (e.g., browse, playback, etc.).

FIGS. 14-36 are exemplary screens of a screen navigation arrangement according to one embodiment of the invention. The screen navigation arrangement can have a hierarchical arrangement so as to facilitate navigation. In this embodiment, the screen navigation arrangement enables a user to navigate through a plurality of different screens of a graphical user interface to assist the user in navigating, browsing, searching or playing media items, such as video items.

The screen navigation arrangement illustrated in FIGS. 14-36 are, for example, screens that can be presented on a display device associated with a client device and interacted with using a user input device coupled to the client device. As an example, the user input device can be a wireless remote controller (e.g., infrared remote controller) that interacts with the client device to enable the user to interact with the screen navigation arrangement.

Figure 14:
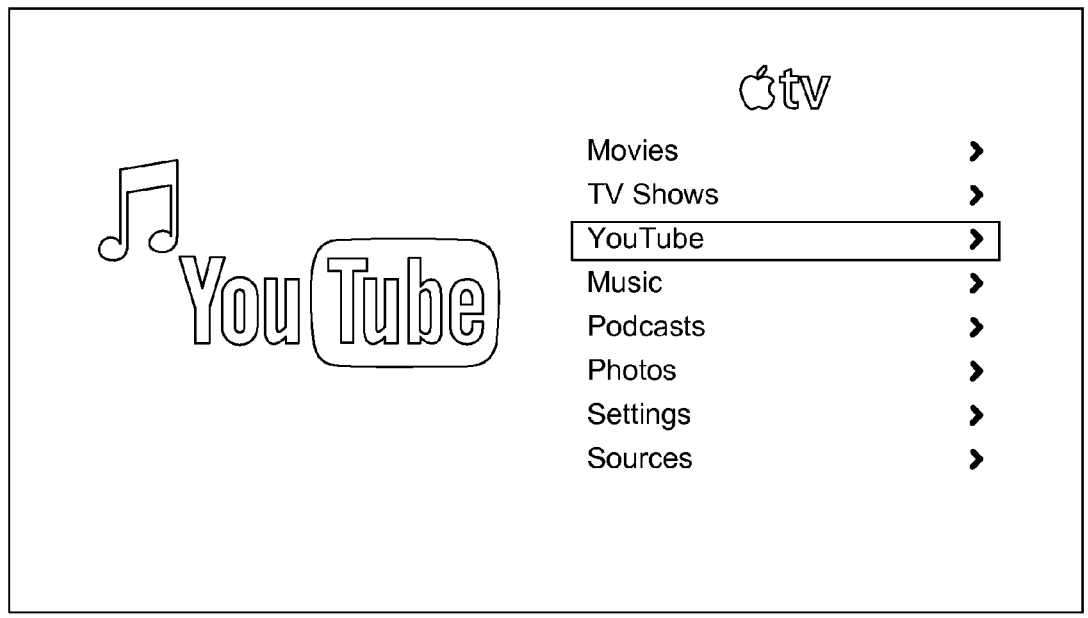
FIGS. 14-36 are exemplary screens of a screen navigation arrangement according to one embodiment of the invention.

FIG. 14 illustrates an exemplary main menu screen. The main menu screen illustrated in FIG. 14 includes a main menu of selectable items. One of the selectable items is designated "YouTube" which supports remote video access via the Internet. YouTube is an Internet-based publisher of media items (e.g., videos). A user can interact with a client device to navigate through the screens of the screen navigation arrangement. If the user desires to browse, search or play videos from a remote video server provided by YouTube, Inc., then the user can interact with the main menu screen to select the "YouTube" item from the main menu.

Figure 15:
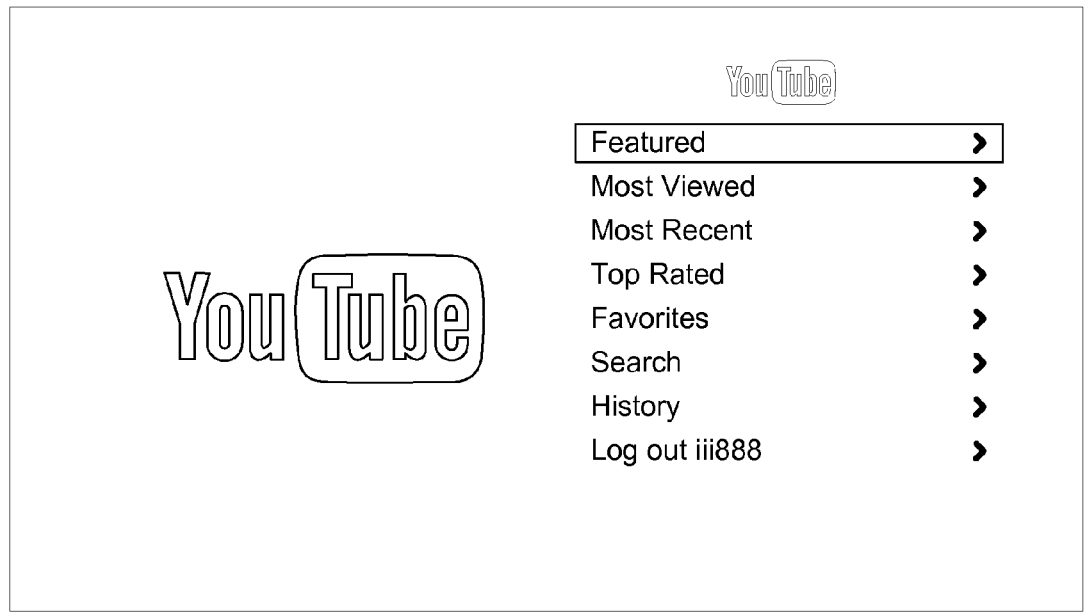
Figure 16:
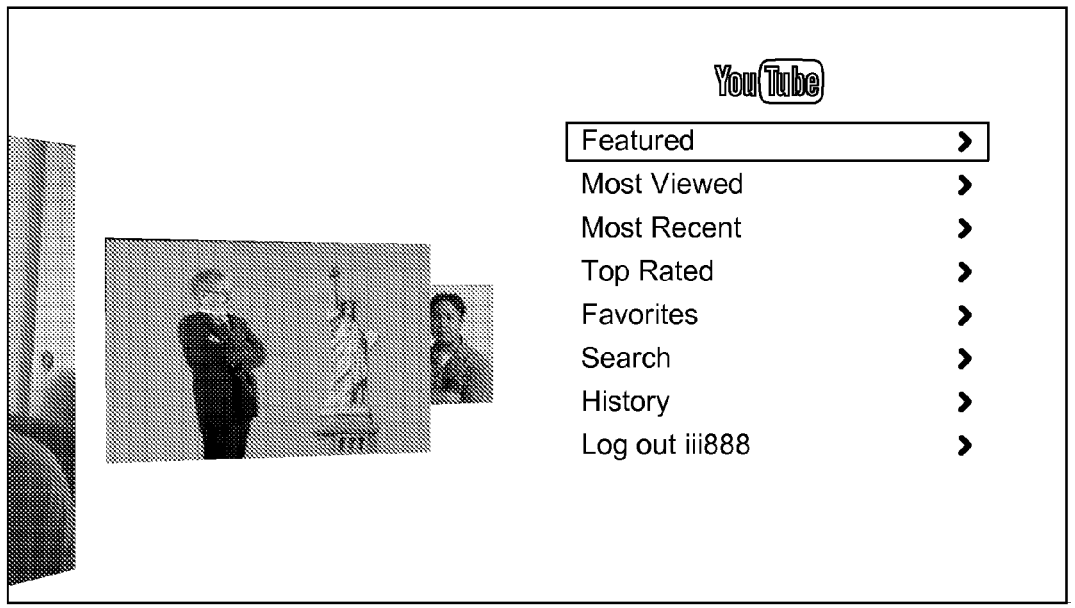

FIGS. 15 and 16 pertain to a video access category screen that presents a plurality of categories that can be selected. As an example, the video access category screen can present a menu that includes categories that can be selected. These categories can include: "Featured", "Most Viewed", "Most Recent", "Top Rated", "Favorites" and "History". In addition, other items within the menu include "Search" and "Logout". In one embodiment, the video access category screen has a left portion and a right portion. The right portion can present the menu. In one example, such as illustrated in FIG. 15, the left portion can display a logo or other image. In another example, such as illustrated in FIG. 16, the left portion can display a one or more images that are associated with a designed (e.g., highlighted) menu item of the menu on the right portion. In one implementation, the one or mores can pertain to images that are associated with video items within the selected category.

Figure 17:
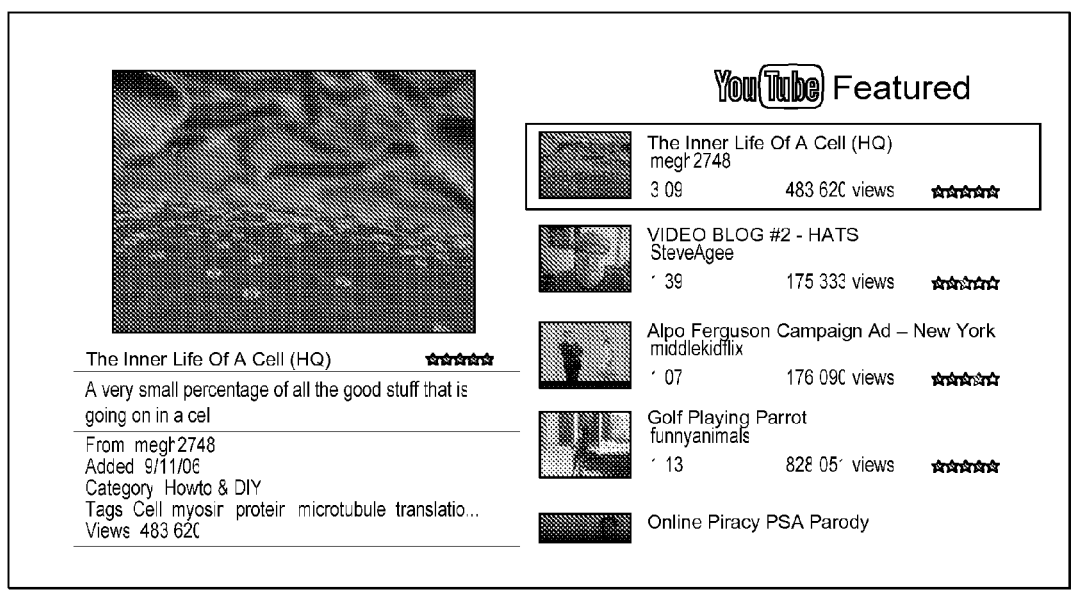

FIG. 17 illustrates a video review screen for the featured videos. The video review screen is configured in a manner similar to the configuration of the media review screen 400 illustrated in FIG. 4. The right side of the video review screen presents a list of video items that are each identified by information pertaining to the video item. For a designated one of the video items from the list, the left side of the video review screen presents more detailed information pertaining to the video item. As illustrated in FIG. 17, the first of the video items identified in the list is designated (e.g., highlighted), thus the left side of the video review screen presents detailed information pertaining to the first of the video items identified in the list.

Figure 18:
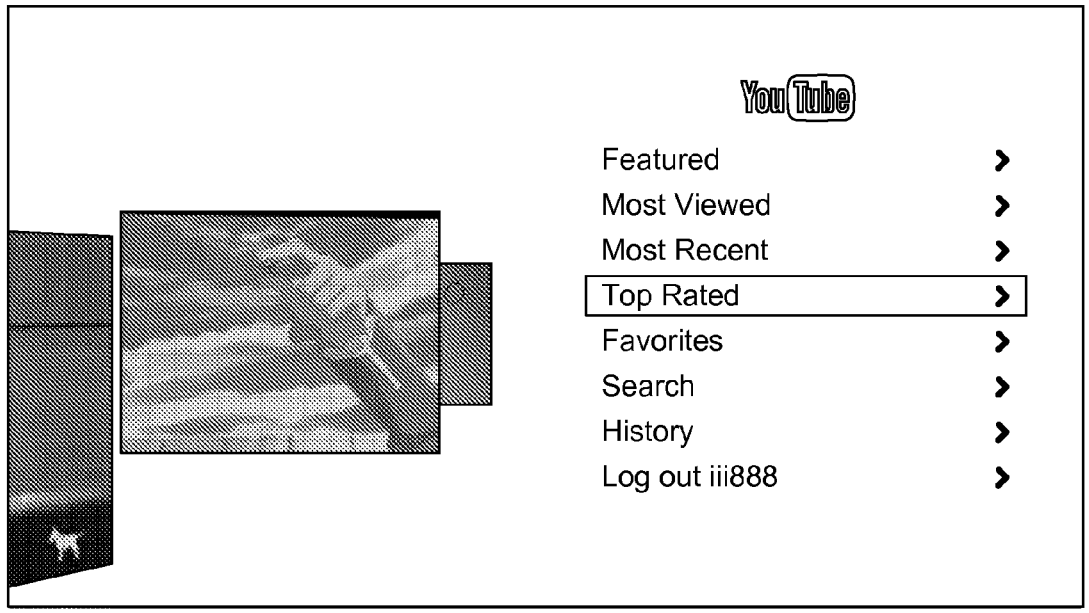
Figure 19:
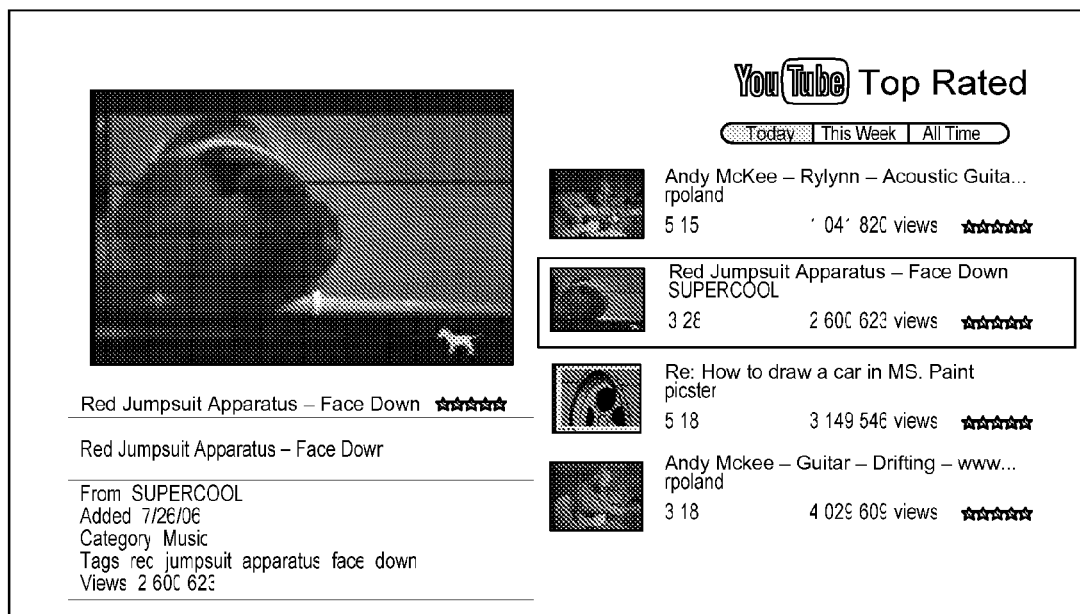

FIG. 18 illustrates a video access category screen with the category "Top-Rated" designated. Once the "Top-Rated" category is selected, a video review screen for top-rated videos can be presented. FIG. 19 illustrates a video review screen for top-rated videos. The format of the video review screen illustrated in FIG. 19 is generally similar to the format of the video review screen illustrated in FIG. 17. As illustrated in FIG. 19, a list of video items is displayed on the right side with the second of the video items identified in the list being designated (e.g., highlighted), thus the left side of the video review screen presents detailed information pertaining to the second of the video items identified in the list.

Figure 20:
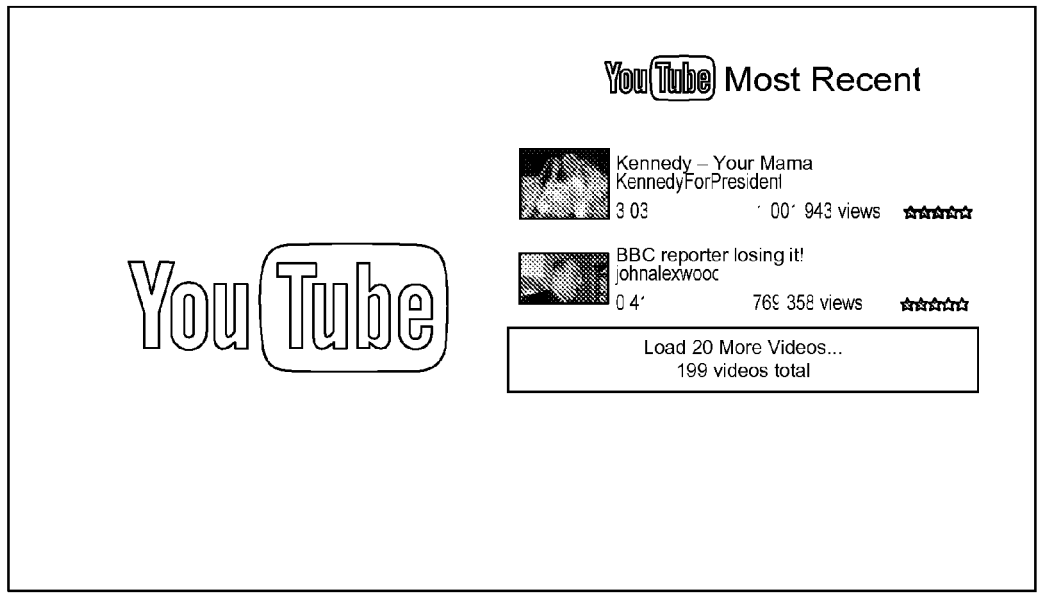

FIG. 20 illustrates a video review screen for most recent videos. The format of the video review screen illustrated in FIG. 20 is generally similar to the format of the video review screen illustrated in FIG. 17. As illustrated in FIG. 20, none of the listed video items are currently designated (e.g., highlighted); hence, the left side of the video review screen does not present detailed information concerning a video item. Additionally, it should be noted that the video review screen illustrated in FIG. 20 includes a "More" control that can be selected by a user to display additional media information for other video items. For example, selection of the "More" control can cause additional information for other media items be obtained from a media server in a manner similar to that discussed above with respect to FIGS. 8A and 8B. Specifically, FIG. 20 indicates that a user interface control, i.e., a "More" control, can be selected to request information on a next set of video items (e.g., twenty (20)), and an indication of a total number (e.g., one-hundred and ninety-nine (199)) video items available. The size of the set being retrieved from the media server can depend on implementation, and the size of the set can be limited by the total number of video items available.

Figure 21:

FIG. 21 illustrates an exemplary video playback screen. For example, from a video review screen, a user can select a video item to be played at the client device. The media content for the selected video item can be acquired from a media server and played by the client device using the video playback screen.

Figure 22:
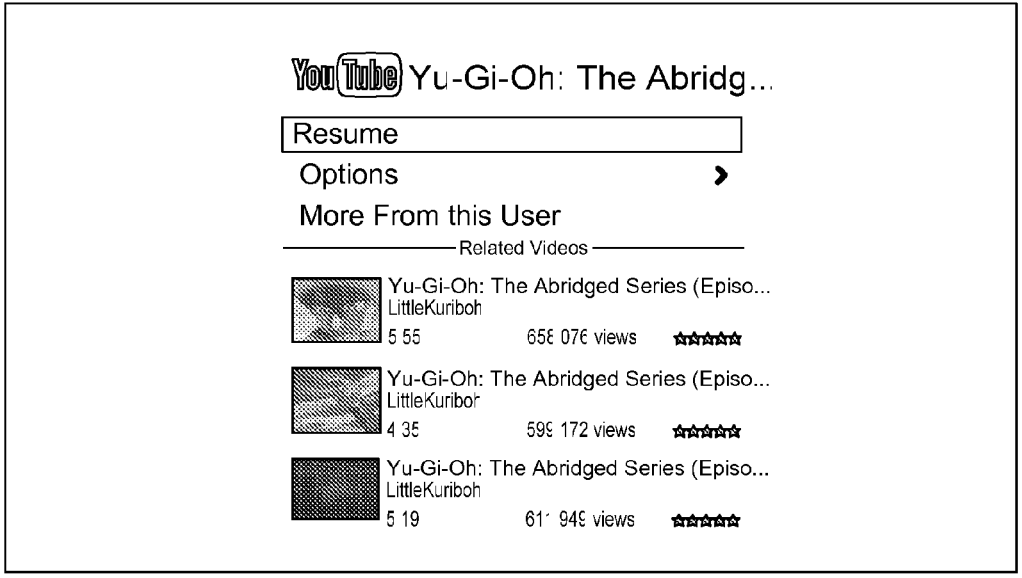
Figure 23:
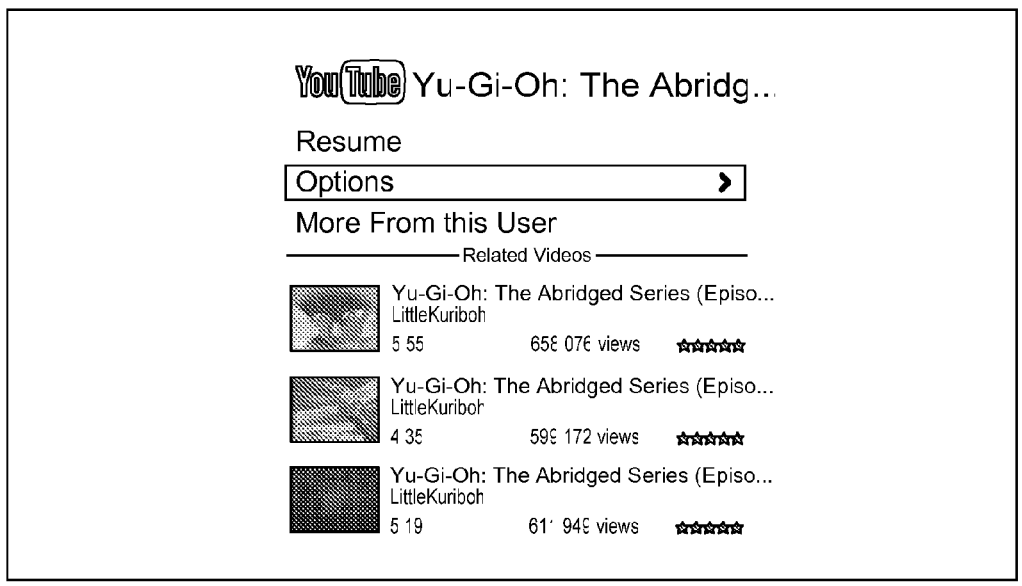
Figure 24:
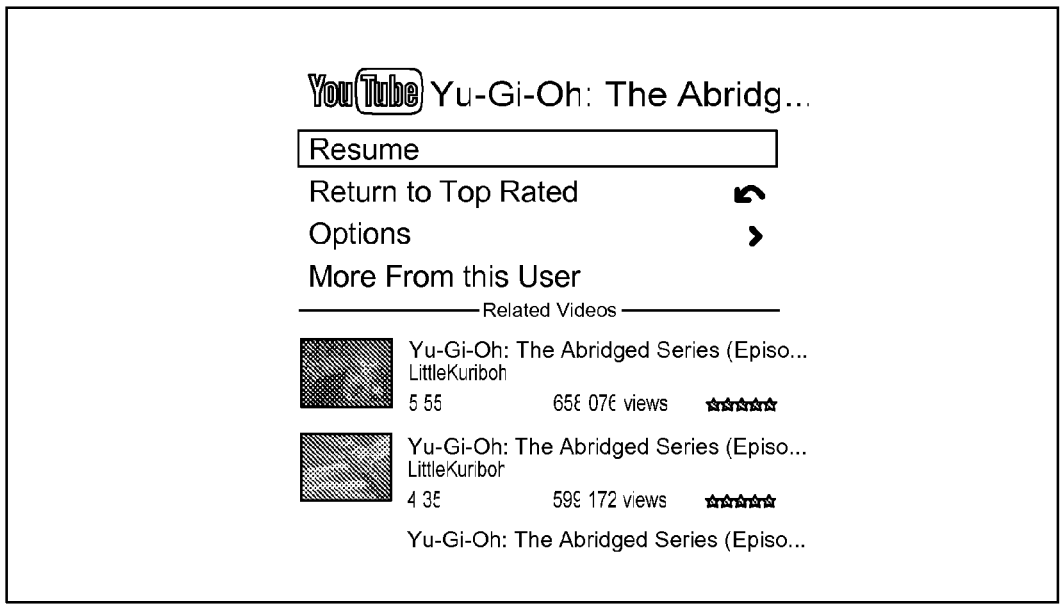

FIGS. 22-24 are exemplary related video screens. In these related video screens, a list of related video items is available and presented. For a given video item, the media server can determine one or more video items that are deemed related to another video item. The related video items can then be displayed (e.g., listed) in a related video screen. The user can then select one of the related videos and obtain additional information or play the corresponding video. The related video screen can further present control or navigation options when video playback, such as by the video playback screen, ends or is exited before ending. The control or navigation options can include: "Resume", "Options", and "More from this User". The "Resume" menu item allows the playback of a previously selected video to resume. In the case in which the playback has completely played (i.e., ended), the "Resume" menu item can be replaced with a "Replay" menu item. The Replay menu item allows the playback of a previously selected video to restart. The "Options" menu item can cause an options screen to be presented. In FIG. 24, the related video screen includes an additional menu item denoted "Return to Top Rated" which allows the user to return to the video review screen that was previously utilized regarding the top rated category.

Figure 25:
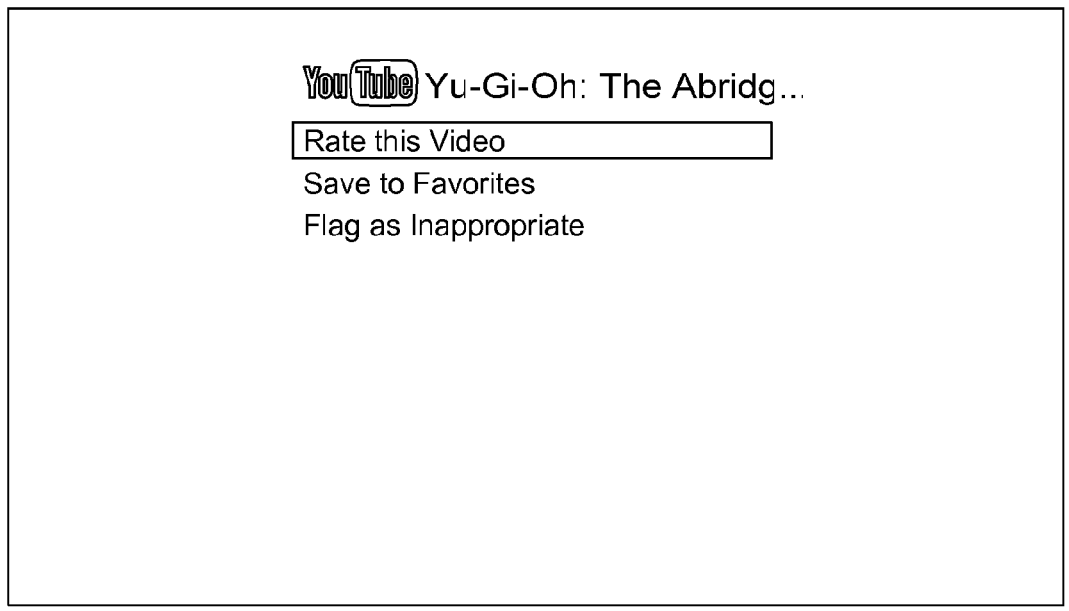

FIG. 25 illustrates an exemplary options screen in which the user is able to rate (e.g., a numerical or star rating) a video, save the video to one's favorites (e.g., favorites storage for a user), or flag the video as inappropriate.

Figure 26:
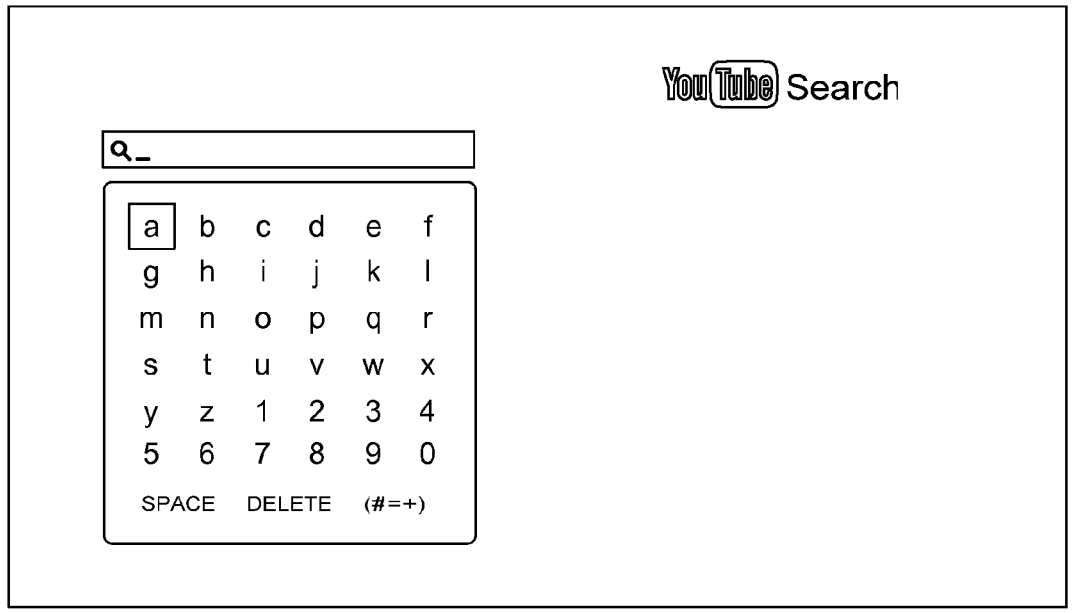

FIGS. 26-31 pertain to search of media items with respect to a media server. When the search menu item from the video access category screen (such as illustrated in FIG. 16) is selected, a base search screen illustrated in FIG. 26 can be presented. A user can then interact with the base search screen to enter a character into a search box. In FIG. 26, the base search screen displays selectable search characters and the search box. A user can select a character (e.g., alphanumeric character) from the selectable search characters to be input into the search box.

Figure 27:
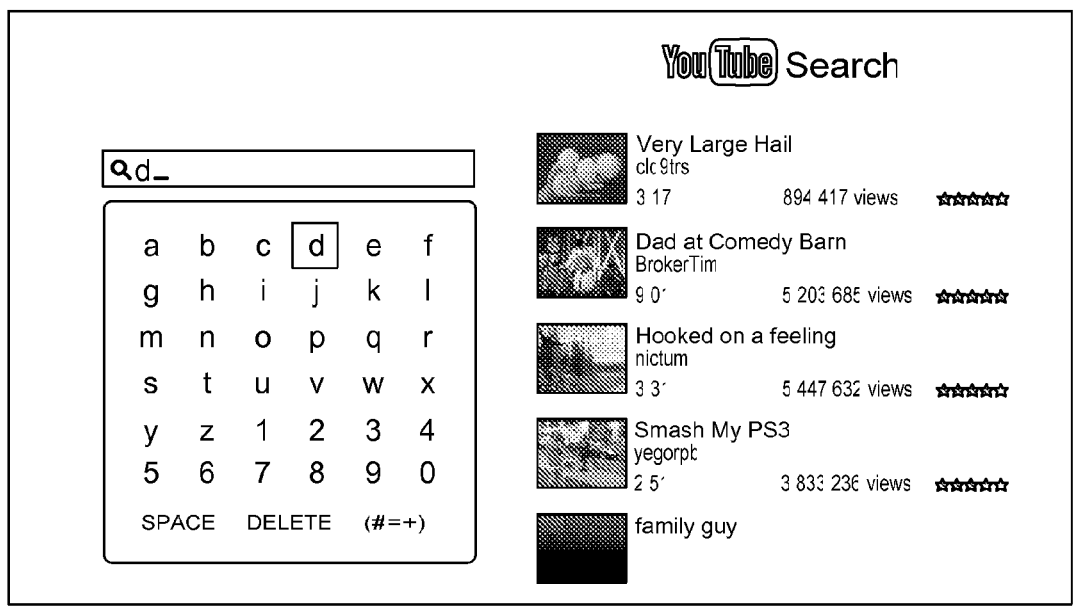
Figure 28:
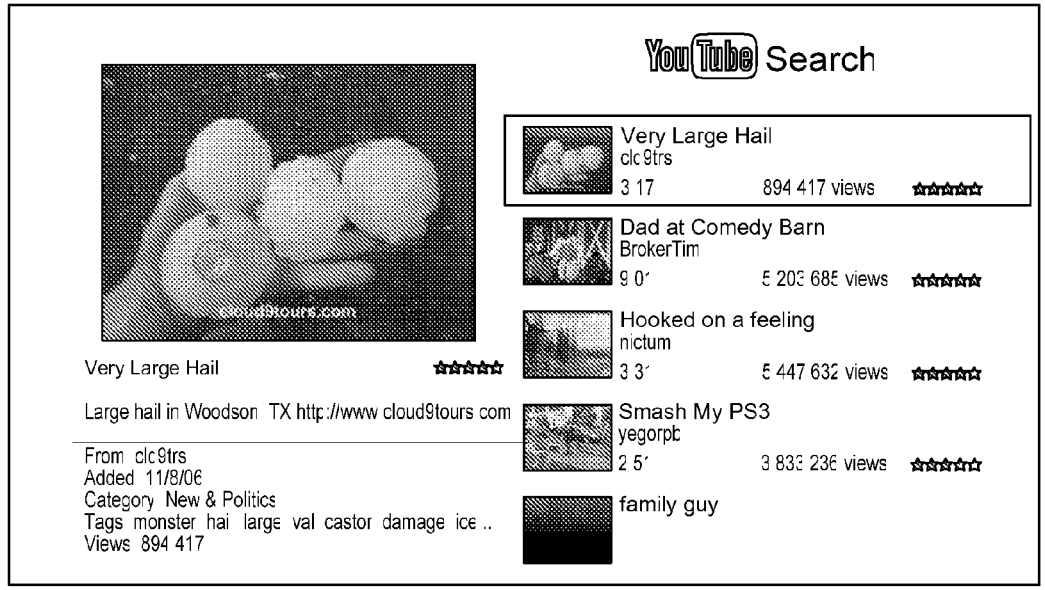

FIG. 27 illustrates a search screen once a character has been entered into the search box. In this example, the character "d" has been entered into the search box, the left side of the search screen contains the presentation of selectable search characters and the search box, and the right side of the search screen displays a list of one or more video items (as identified by media information) that are deemed to "match" the search character. The user can interact with the list of video items on the right side of the search screen to produce a video review screen or to produce a video playback screen to play one of the video items. FIG. 28 illustrates a video review screen following user designation of one of the video items from the search screen. The video review screen illustrated in FIG. 28 has a format similar to the video review screens illustrated in FIGS. 17 and 19.

Figure 29:
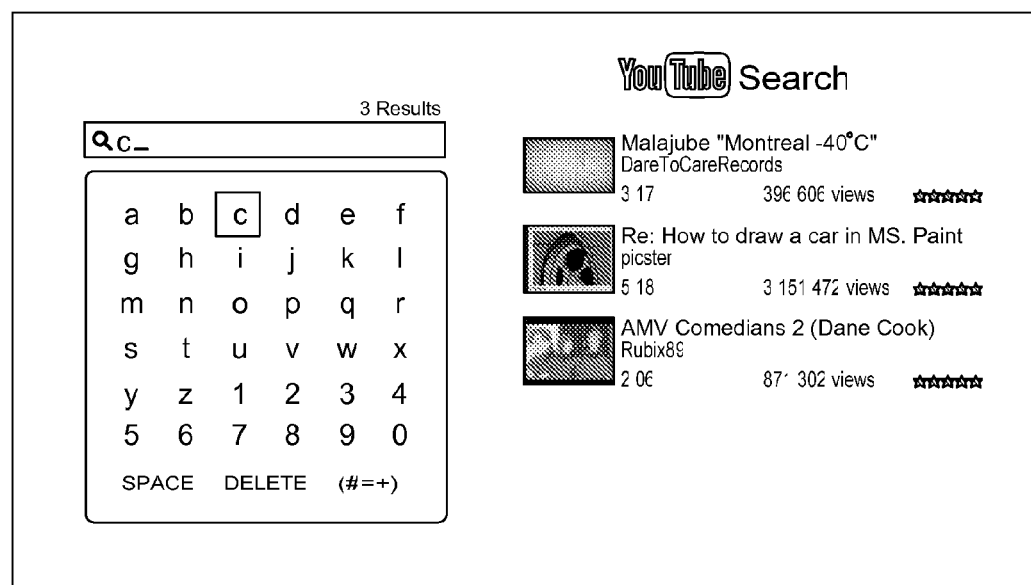
Figure 30:
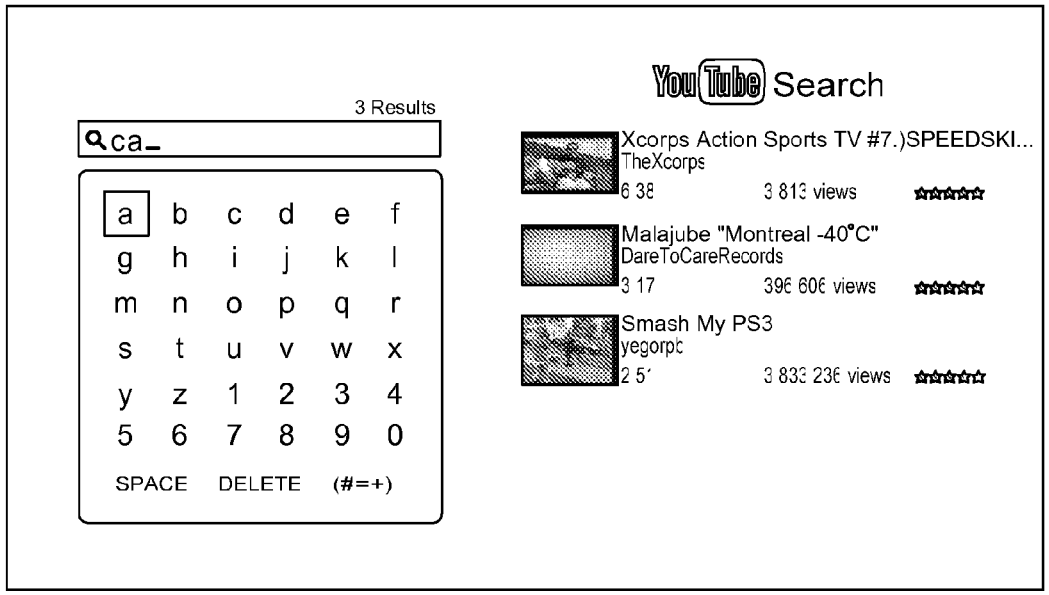

FIG. 29 illustrates a search screen after a search character "c" has been entered in the search box. In this example, there are three (3) matching video items available from a media server (e.g., video server). FIG. 30 illustrates the search screen following FIG. 29 after a second character "a" has been entered into the search box. At this point, the search string is "ca" and there are three (3) matching media items that are displayed on the right portion of the search screen illustrated in FIG. 30. Still further, FIG. 31 illustrates the search screen following FIG. 30 after a third character "t" is entered into the search box, and wherein the "matching" media items is, in this example, only a single media item.

Figure 31:
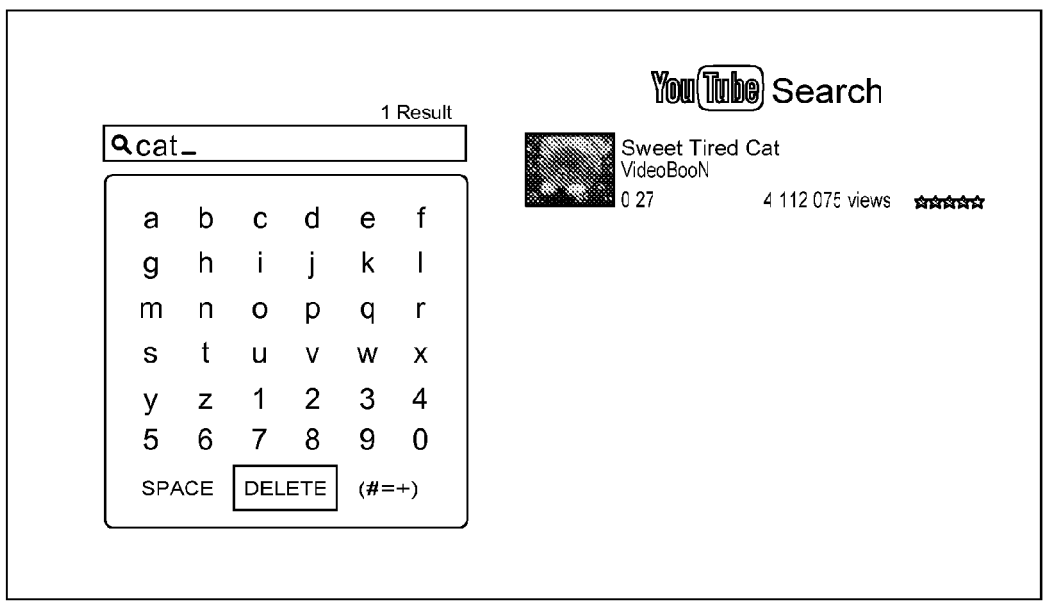

Hence, FIGS. 29-31 show a progressive search being performed with each character entry.

Figure 32:
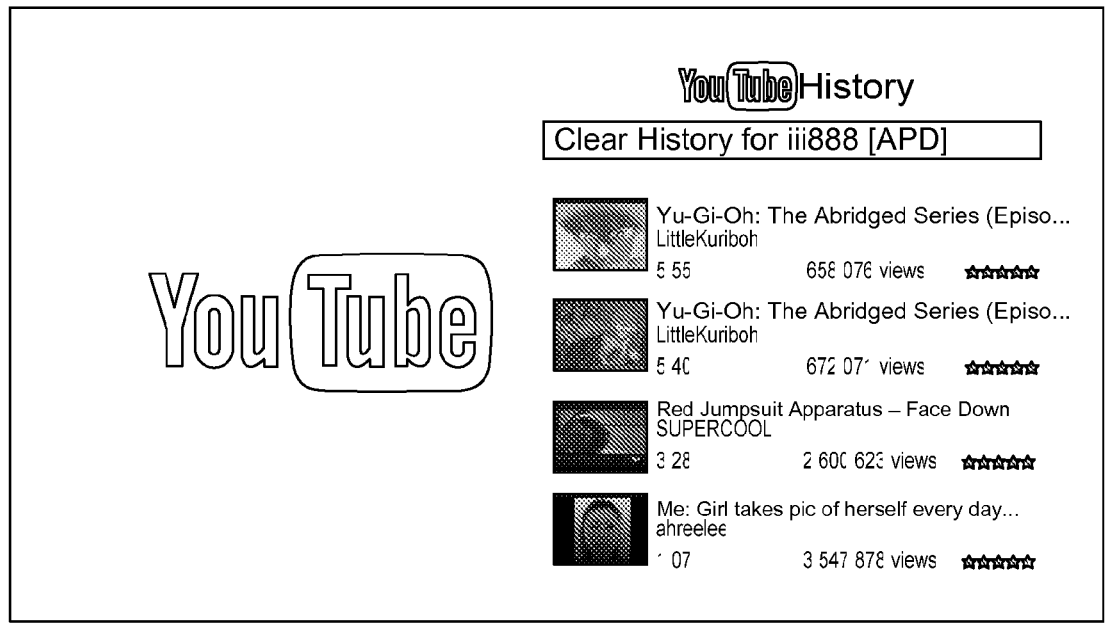

FIG. 32 is a history screen for a particular user account. Once the history category is selected (e.g., from a video access category screen), a video review screen for video history can be presented. The video history can be those videos that were last watched by a particular user. Since history is maintained for a particular user, the particular user is required to be logged-in to the media server to gain access to one's history. The history data can be stored locally and/or remotely at the media server.

Figure 33:
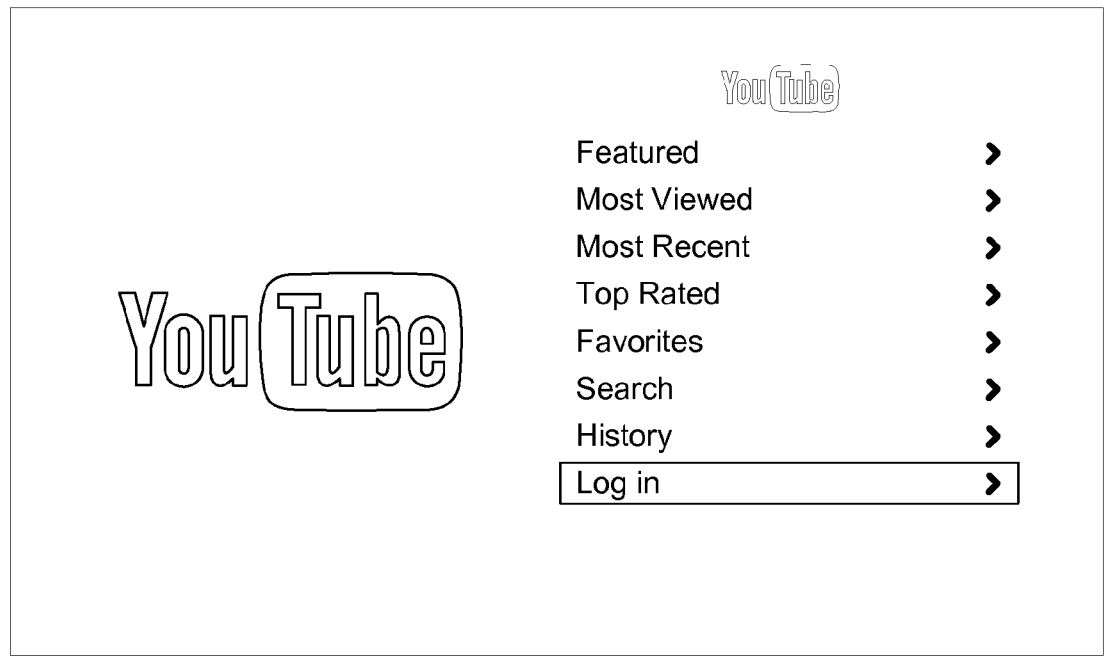
Figure 34:
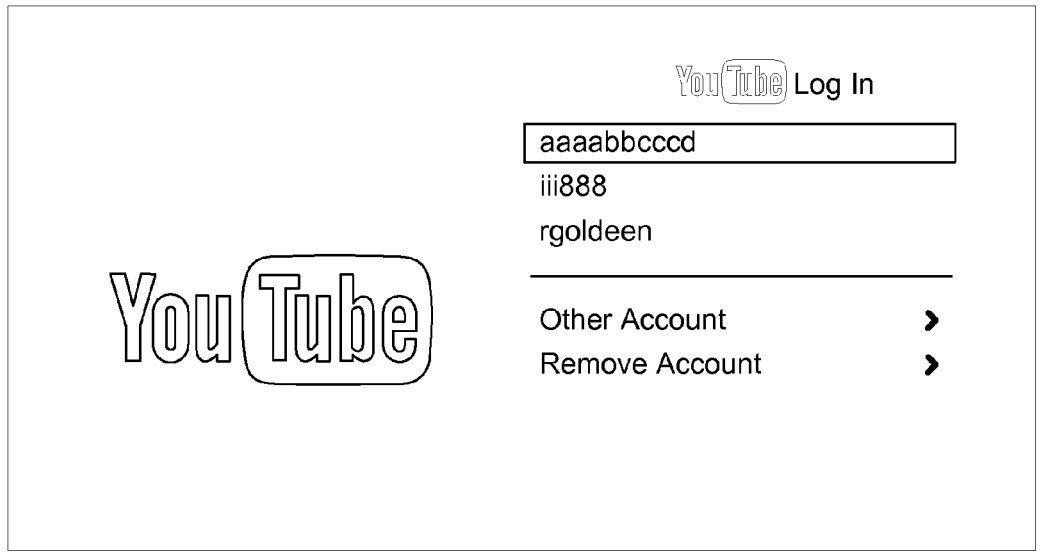
Figure 35:
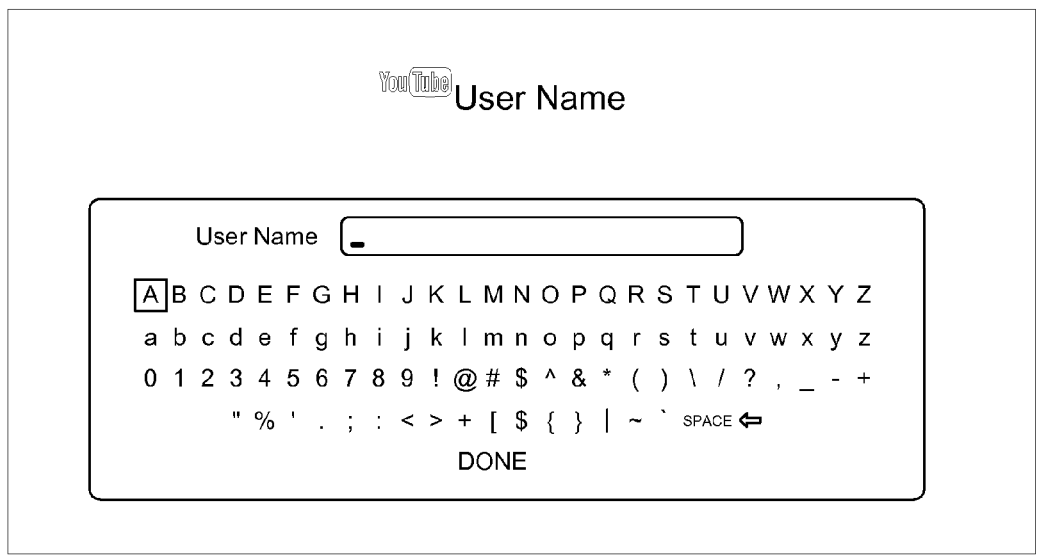
Figure 36:
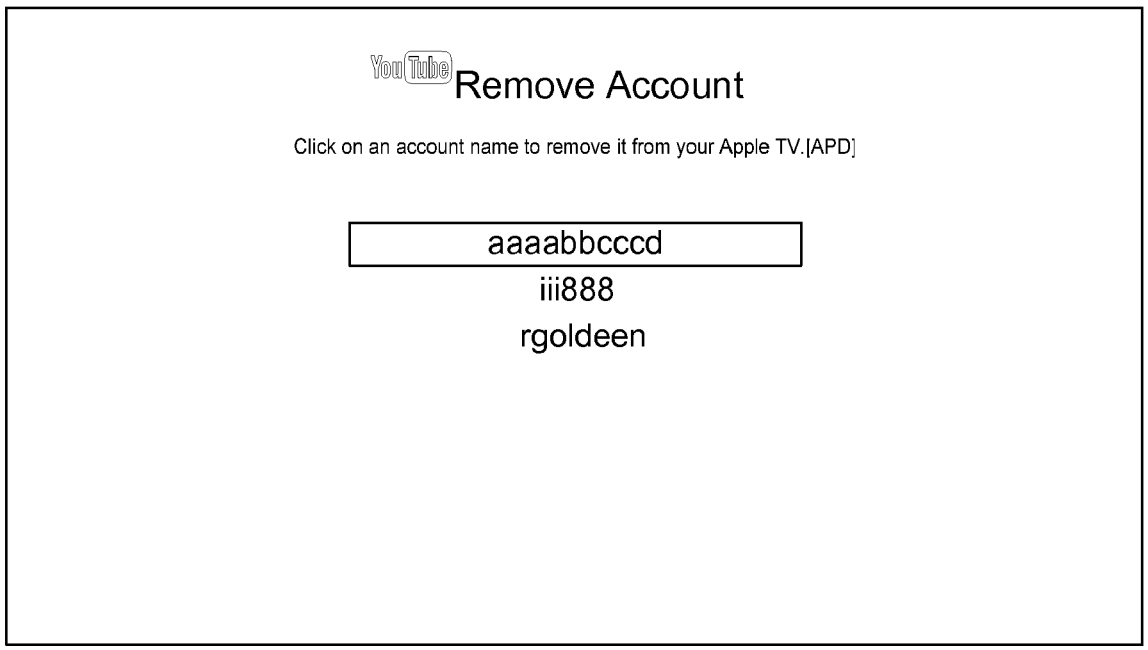

The video access category screen can include a log-in/log-out menu item. The log-out menu item occurs after a user has already logged into the media server. FIG. 15, for example, illustrated a video access category screen having a "Log Out" menu item. FIG. 33 illustrates a video access category screen prior to log-in. In such a case, the menu includes a "Log In" menu item. When the "Log In" menu item is selected, a log-in screen can be presented. FIG. 34 illustrates an exemplary log-in screen that allows a user to log into an existing (or new) account. The log-in screen also allows a user to remove an account. If the user selects one of the accounts to log-in from the log-in screen, a user name entry screen can be presented to the user. FIG. 35 illustrates an exemplary user name entry screen. The user name entry screen allows for the display of all available characters that can be utilized in the user name. Hence, the user can interact with the user name entry screen to select the characters that form the user name. If the user decides to remove an account from the log-in screen illustrated in FIG. 34 (i.e., remove account option selected), a remove account screen can be presented. FIG. 36 illustrates an exemplary remove accounts screen. The remove account accounts screen displays a list of previously established accounts and permits a user to select an account to be removed.

The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may offer different advantages.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for accessing media items from a media server that hosts a plurality of media items, said method comprising:

(a) requesting, from the media server, information pertaining to a first set of one or more media items that have at least one common classification;

(b) receiving, from the media server, the requested information pertaining to the first set of one or more media items that have the at least one common classification;

(c) storing, following said receiving (b), the requested information pertaining to the first set of one or more media items to an electronic apparatus;

(d) displaying at least a first portion of the requested information for at least a plurality of the media items in the first set of media items;

(e) displaying a user selectable control to initiate a request for information pertaining to a second set of one or more media items that have the at least one common classification, the second set being different from the first set;

(f) receiving, from the media server, the requested information pertaining to the second set of one or more media items that have the at least one common classification;

(g) storing, following said receiving (f), the requested information pertaining to the second set of one or more media items to the electronic apparatus; and (h) displaying at least a first portion of the requested information for at least a plurality of the media items in the first set of media items or the second set of media items.

2. A method as recited in claim 1, wherein said method is performed by the electronic apparatus that couples to the media server via a network.

3. A method as recited in claim 1, wherein said method further comprises: combining the requested information for the first set of one or more media items with the second set of one or more media items, wherein any plurality of the media items within the first set and the second set can be displayed by said displaying (f).

4. A method as recited in claim 3, wherein said displaying (h) is associated with scrolling or browsing of the media items in the first set and/or the second set.

5. A method as recited in claim 1, wherein said method further comprises: merging the requested information for the first set of one or more media items with the second set of one or more media items to form a combined set.

6. A method as recited in claim 5, wherein said displaying (h) displays at least a first portion of the requested information for at least a plurality of the media items in the combined set.

7. A method as recited in claim 6, wherein said displaying (h) is associated with scrolling or browsing of the media items in the combined set.

8. A method as recited in claim 5, wherein said method further comprises:

displaying an indication of the number of the media items in the combined set.

9. A method as recited in claim 1, wherein said method further comprises:

displaying an indication of a total number of media items available on the media server that have the at least one common classification.

10. A method as recited in claim 1, wherein said displaying (e) displays the user selectable control concurrently with said either displaying (d) or said displaying (h).

11. A method as recited in claim 1, wherein the common classification is based on a categorization for media items.

12. A method as recited in claim 11, wherein the categorization includes one or more categories selected from the group of: featured, most viewed, most recent, top rated, favorites, or history.

13. A method as recited in claim 1, wherein said method is performed by an electronic apparatus coupled to a television.

14. A method as recited in claim 1, wherein said method further comprises:

(i) receiving a user designation of one of the media items within the plurality of media items being displayed by said displaying (d); and (j) displaying, concurrently with said displaying (d), a second portion of the requested information for the user designated one of the media items in the first set of media items, the second portion including at least one piece of information pertaining to the designated one of the media items beyond the first portion.

15. A method as recited in claim 14, wherein said method is performed by an electronic apparatus coupled to a television, and wherein said displaying (d) and said displaying (j) are displayed on the television, and wherein the user designation being received by said receiving (i) is done by user interaction with the electronic apparatus using a wireless remote controller.

16. A method as recited in claim 1, wherein said method further comprises:

(i) receiving a user selection of one or more media items in the first set of media items;

(j) requesting, from the media server, media content pertaining to the selected one of the media items;

(k) receiving, from the media server, the requested media content pertaining to the selected one of the media items; and (l) playing the received media content.

17. A method as recited in claim 16, wherein said receiving (k) is provided by the media server streaming the media content to the electronic apparatus.

18. A method for accessing media items from a media server that hosts a plurality of media items, said method comprising:

(a) requesting, from the media server, information pertaining to a first set of one or more media items that match a selected category;

(b) receiving, from the media server, the requested information pertaining to the first set of one or more media items that match the selected category;

(c) displaying at least a first portion of the requested information for at least a plurality of the media items in the first set of media items;

(d) displaying a user selectable control to initiate a request for information pertaining to a second set of one or more media items that match the selected category;

(e) requesting, from the media server, information pertaining to a second set of media items that match the selected category, said requesting (e) being based on selection of the user selectable control;

(f) receiving, from the media server, the requested information pertaining to the second set of media items; and (g) combining the requested information pertaining to the second set of media items with the requested information pertaining to the first set of media items that was previously received.

19. A method as recited in claim 18, wherein said combining (g) comprises concatenating the second set of media items with the first set of media items.

20. A method as recited in claim 18, wherein said combining (g) forms a combined set, and wherein said displaying (c) displays at least a first portion of the requested information for at least a plurality of the media items in the combined set of media items.

21. A method as recited in claim 20, wherein said combining (g) forms a list that is scrollable on being displayed, whereby a first portion of the requested information for a plurality of the media items in the combined set of media items is displayed via the list.

22. An electronic apparatus for accessing and presenting media information available from a remote media server, said electronic apparatus comprising:

a display device;

a remote controller enabling a user to interact with said electronic apparatus;

a memory device for storing data and computer program instructions, the computer program instructions include at least:

computer program instructions for requesting, from the media server, information pertaining to a first set of one or more media items that match a selected category;

computer program instructions for receiving, from the media server, the requested information pertaining to the first set of one or more media items that match the selected category;

computer program instructions for displaying at least a first portion of the requested information for at least a plurality of the media items in the first set of media items;

computer program instructions for displaying a user selectable control to initiate a request for information pertaining to a second set of one or more media items that match the selected category;

computer program instructions for requesting, from the media server, information pertaining to a second set of media items that match the selected category, said requesting being based on selection of the user selectable control;

computer program instructions for receiving, from the media server, the requested information pertaining to the second set of media items; and computer program instructions for combining the requested information pertaining to the second set of media items with the requested information pertaining to the first set of media items that was previously received.

* * * * *

UNITED STATES PATENT AND TRADEMARK OFFICE
CERTIFICATE OF CORRECTION

| | |
|---|---|
| PATENT NO. | : 7,743,116 B2 |
| APPLICATION NO. | : 11/754346 |
| DATED | : June 22, 2010 |
| INVENTOR(S) | : Rachel Clare Goldeen et al. |

It is certified that error appears in the above-identified patent and that said Letters Patent is hereby corrected as shown below:

On Title page 2, Item (56), under "Other Publications", line 2, delete "Assoication" and insert -- Association --, therefor.

On Title page 2, Item (56), under "Other Publications", line 2, delete "Articial" and insert -- Artificial --, therefor.

In column 1, lines 9-21, delete "application Ser. No. 11/754,347, filed May 28, 2007, and entitled "METHOD AND USER INTERFACE FOR ACCESSING MEDIA ASSETS OVER A NETWORK," which is hereby incorporated herein by reference; (ii) U.S. patent application Ser. No. 11/754,349, filed May 28, 2007, and entitled "METHOD AND USER INTERFACE FOR SEARCHING MEDIA ASSETS OVER A NETWORK," which is hereby incorporated herein by reference; and (iii) U.S. patent application Ser. No. 11/754,348, filed May 28, 2007, and entitled "HIERARCHICAL USER INTERFACE FOR ACCESSING RELATED MEDIA ASSETS," which is hereby incorporated herein by reference." and insert the same on col. 1, line 8, after "U.S. patent" as a continuation of the same paragraph.

In column 16, line 21, after "1304." delete "l".

In column 20, line 31, in Claim 3, delete "(f)." and insert -- (h). --, therefor.

Signed and Sealed this
Eighth Day of November, 2011

David J. Kappos
*Director of the United States Patent and Trademark Office*